(12) United States Patent
Kondo

(10) Patent No.: US 8,743,255 B2
(45) Date of Patent: Jun. 3, 2014

(54) SOLID-STATE IMAGE PICKUP APPARATUS AND SOLID-STATE IMAGE PICKUP METHOD TO REDUCE POWER CONSUMPTION

(75) Inventor: Toru Kondo, Tokyo (JP)

(73) Assignee: Olympus Corporation, Tokyo (JP)

( * ) Notice: Subject to any disclaimer, the term of this patent is extended or adjusted under 35 U.S.C. 154(b) by 446 days.

(21) Appl. No.: 12/607,353

(22) Filed: Oct. 28, 2009

(65) Prior Publication Data

US 2010/0103302 A1 Apr. 29, 2010

(30) Foreign Application Priority Data

Oct. 29, 2008 (JP) .................................. 2008-278293

(51) Int. Cl.
*H04N 3/14* (2006.01)
*H04N 5/335* (2011.01)
(52) U.S. Cl.
USPC .......................................... 348/308; 348/294
(58) Field of Classification Search
None
See application file for complete search history.

(56) References Cited

U.S. PATENT DOCUMENTS

| | | | |
|---|---|---|---|
| 6,784,928 B1 | 8/2004 | Sakurai et al. | |
| 2002/0100921 A1* | 8/2002 | Mabuchi et al. | 257/222 |
| 2007/0146514 A1* | 6/2007 | Maeda et al. | 348/294 |
| 2008/0062295 A1* | 3/2008 | Fujimura et al. | 348/301 |
| 2008/0204822 A1* | 8/2008 | Yamamoto | 358/482 |

FOREIGN PATENT DOCUMENTS

| | | |
|---|---|---|
| JP | 11-191891 A | 7/1999 |
| JP | 2007-142738 A | 6/2007 |
| JP | 2008-211540 A | 9/2008 |

OTHER PUBLICATIONS

Japanese Office Action dated Sep. 4, 2012, issued in corresponding Japanese Patent Application No. 2008-278293, (6 pages). With EnglishTranslation.

* cited by examiner

*Primary Examiner* — Justin P Misleh
(74) *Attorney, Agent, or Firm* — Westerman, Hattori, Daniels & Adrian, LLP

(57) ABSTRACT

A solid-state image pickup apparatus including a pixel section, a column circuit, and a column circuit controlling section. The pixel section includes a plurality of unit pixels arranged in a matrix and converts an input optical signal to an electric signal. The column circuit processes the electric signal which is outputted from the pixel section column by column. The column circuit current controlling section reduces current of the column circuit, whose electric signal is not read out, than current of column circuit whose electric signal is read out, when a first mode which thins out and reads out electric signals of column circuits is set.

2 Claims, 19 Drawing Sheets

SOLID-STATE IMAGE PICKUP APPARATUS AND SOLID-STATE IMAGE PICKUP METHOD TO REDUCE POWER CONSUMPTION

BACKGROUND OF THE INVENTION

1. Field of the Invention

The present invention relates to a solid-state image pickup apparatus and a solid-state image pickup method.

Priority is claimed on Japanese Patent Application No. 2008-278293 filed on Oct. 29, 2008, the contents of which are incorporated herein by reference.

2. Description of Related Art

An image pickup apparatus (for example, a digital still camera) which converts an optical signal to an electric signal and outputs an image signal is known. As a solid-state image pickup apparatus which is used for an image pickup device of the image pickup apparatus, a lot of research and development relating to a MOS (Metal-Oxide Semiconductor) type solid-state image pickup apparatus has been conducted.

FIG. 15 is a circuit diagram showing a conventional MOS type solid-state image pickup apparatus which is able to switch between a first mode, which thins out and reads out pixels, and a second mode, which reads out all pixels (for example, Japanese Unexamined Patent Publication, First Publication No. H11-191891). The MOS type solid-state image pickup apparatus includes a vertical scanning section 2, vertical signal lines 3_1 to 3_4, column circuits 4_1 to 4_4 and pixels 11 to 24.

The vertical scanning section 2 supplies a pulse for reading out electric signal to the pixels 11 to 14 and pixels 21 to 24 which are arranged in a matrix. The vertical signal lines 3_1 to 3_4 transmit signals which are outputted from pixels 11 to 24. The column circuits 4_1 to 4_4 perform analog processing for signals of the vertical signal lines 3_1 to 3_4.

The MOS type solid-state image pickup apparatus includes a horizontal scanning section 5, horizontal signal lines 6_1 and 6_2, output amplifiers 7_1 and 7_2, a mode setting section 8 and a column selection transistor M9. The column selection transistor M9 selectively outputs signals from the column circuits 4_1 to 4_4 to the horizontal signal lines 6_1 and 6_2. The horizontal scanning section 5 supplies a pulse for selecting column to the column selection transistor M9. The output amplifiers 7_1 and 7_2 amplify and output signals outputted from the horizontal signal lines 6_1 and 6_2. The mode setting section 8 switches a plurality of modes for reading out electric signal.

In aforementioned solid-state image pickup apparatus, in case of a mode which reads out all pixels, the signals which are outputted from the column circuits 4_1 to 4_4 are read out to the horizontal signal lines 6_1 and 6_2 by column selection pulses φH1 to φH4. The output amplifiers 7_1 and 7_2 output signals outputted from output channels OUT1 and OUT2.

In case of a mode for thinning out half column and reading out electric signal, the signals which outputted from the column circuits 4_1 and 4_3 are read out to the horizontal signal line 6_1 by column selection pulses φH1 and φH3. Then, the output amplifier 7_1 reads out a signal of the output channel OUT1, and does not read out from the column circuits 4_2 and 4_4. In this case, the mode setting section 8 reduces the bias current of the output amplifier 7_2 which is not used. Therefore, whole electrical power consumption is reduced.

Recently, as a column circuit, a MOS type solid-state image pickup apparatus which has an amplification function has been developed. The conventional art shown in FIG. 15 which is applied to the column amplification function is described below, with reference to FIGS. 16 to 18. FIG. 16 is a circuit diagram showing a configuration of the conventional MOS type solid-state image pickup apparatus which is applied to the amplification function.

The MOS type solid-state image pickup apparatus includes a vertical scanning section 2, vertical signal lines 3_1 to 3_4, pixels 11 to 24, and a pixel bias current source IPIX. The vertical scanning section 2 supplies pulses for reading out electric signal to the pixels 11 to 14 and the pixels 21 to 24 which are arranged in a matrix. The vertical signal lines 3_1 to 3_4 transmit signals which are outputted from the pixels 11 to 24. The pixel bias current source IPIX flows a constant current to the vertical signal lines 3_1 to 3_4. In addition, the MOS type solid-state image pickup apparatus includes column circuits 4_1 to 4_4, a horizontal scanning section 5 and a column selection transistor M9. The column circuits 4_1 to 4_4 amplify and store electric potentials of the vertical signal lines 3_1 to 3_4. The column selection transistor M9 selectively outputs signals from the column circuits 4_1 to 4_4 to the horizontal signal lines 6_1 and 6_2. The horizontal scanning section 5 supplies a column selection pulse to the column selection transistor M9. In addition, the MOS type solid-state image pickup apparatus includes output amplifiers 7_1 and 7_2, a mode setting section 8 and a horizontal signal line reset transistor M10. The horizontal signal line reset transistor M10 resets horizontal signal lines 6_1 and 6_2 by a horizontal signal line reset voltage VR. The output amplifiers 7_1 and 7_2 amplify and output signals from the horizontal signal lines 6_1 and 6_2. The mode setting section 8 switches a plurality of modes for reading out.

The pixels 11 to 24 each include a photo diode PD, a transmission transistor M1, an amplification transistor M3, a reset transistor M2 and a row selection transistor M4. The photo diode PD converts an input optical signal to an electric signal. The transmission transistor M1 transmits the electric signal stored in the photo diode PD. The amplification transistor M3 amplifies a transmitted electric signal. The reset transistor M2 resets the electric potential of an electrode (for example, the gate electrode of the amplification transistor M3). The row selection transistor M4 selectively outputs the amplified signal based on the electric signal.

The vertical scanning section 2 supplies transmission pulses φTX1 and φTX2, reset pulses φRST1 and φRST2 and row selection pulses φROW1 and φROW2 to gates of the transmission transistor M1, the reset transistor M2 and the row selection transistor M4 row by row. The drain electrodes of the reset transistor M2 and the amplification transistor M3 are connected to the pixel electric source VDD.

The column circuits 4_1 to 4_4 include a column amplifier 41, a clamp capacity Cc and a clamp transistor M6. The column amplifier 41 amplifies the signals from the pixels 11 to 24. The clamp capacity Cc is connected to a non-inversion input terminal of the column amplifier 41, and clamps an output signal from the pixels 11 to 24 with a clamp voltage VC. The clamp transistor M6 supplies clamp voltage VC to the non-inversion input terminal of the column amplifier 41.

The column circuits 4_1 to 4_4 include a feedback capacity Cf, an amplification capacity Cg, a sample hold capacity Cs, an amplifier reset transistor M7 and a sample hold transistor M8. The feedback capacity Cf and the amplifier reset transistor M7 are connected between the non-inversion input terminal of the column amplifier 41 and an output terminal. The amplification capacity Cg is connected between the non-inversion input terminal of the column amplifier 41 and the ground, and sets the amplification factor of the column amplifier 41. The sample hold capacity Cs stores the output signal of the column amplifier 41. The sample hold transistor M8 connects the output terminal of the column amplifier 41 and the sample hold capacity Cs.

A column circuit bias current control voltage VBIAS for controlling the bias current of the column amplifier 41 is supplied to the column circuits 4_1 to 4_4. The clamp pulse φCL is inputted to the gates of the clamp transistor M6 and the amplifier reset transistor M7. The sample hold pulse φHS is inputted to the gate of the sample hold transistor M8.

The column selection pulses φH1 to φH4 are inputted to each of the gates of the column selection transistor M9. The horizontal signal line reset pulse φRS is inputted to the gate of the horizontal signal line reset transistor M10.

Next, an operation of the MOS type solid-state image pickup apparatus shown in FIG. 16 is described below with reference to timing charts of FIGS. 17 and 18. In addition, in voltage level, a high level is indicated with the character "H", and a low level is indicated with the character "L".

FIG. 17 is a timing chart showing an operation for reading out all pixels in the MOS type solid-state image pickup apparatus. First, an operation for reading out from the pixels 11 to 14 of the first row is enabled by the vertical scanning section 2.

Next, the vertical scanning section 2 sets the row selection transistor M4 to an ON-state by setting row selection pulse φROW1 to "H", and reads out the output of the amplification transistor M3 to each of the vertical signal lines 3_1 to 3_4.

Next, the vertical scanning section 2 sets the reset transistor M2 to the ON-state by setting reset pulse φRST1 to "H", and resets the gate of the amplification transistor M3 to the reset electric potential. Next, the vertical scanning section 2 reads out the output signals in response to the reset voltage of the pixels 11 to 14. Here, the vertical scanning section 2 sets the clamp pulse φCL to "H", and resets the column circuits 4_1 to 4_4 by setting the amplifier reset transistor M7 to the ON-state. In addition, the vertical scanning section 2 clamps the non-inversion input terminal of the column amplifier 41 to the clamp voltage VC by setting the clamp transistor M6 to the ON-state.

Next, the vertical scanning section 2 sets the reset pulse φRST1 to "L", and sets the clamp pulse φCL to "L", and finishes a clamp processing. Next, the vertical scanning section 2 sets the transmission pulse φTX1 to "H", and sets the transmission transistor M1 to the ON-state. In addition, the vertical scanning section 2 transmits the electric signal involved in the optical signal which occurred in the photo diode PD to the gate of the amplification transistor M3, and sets the transmission pulse φTX1 to "L". Therefore, the amplified electric signals involved in optical signals of each pixels are outputted to each of the vertical signal lines 3_1 to 3_4.

In addition, the non-inversion input terminal of the column amplifier 41 changes, by the clamp capacity Cc, a variation ΔSig based on the electric signal involved in the optical signal from the reset electric potential of the pixels 11 to 14. Here, the output of the column amplifier 41 changes (1+Cg/Cf)ΔSig compared to the clamp voltage VC. In addition, the sample hold pulse is set to "H" (φHS="H"), and the signal read out from the column amplifier 41 is read out to the sample hold capacity Cs, and the signal is stored as the sample hold pulse φHS (φHS="L").

Finally, the horizontal signal lines 6_1 and 6_2 are reset to the horizontal signal line reset voltage VR by the horizontal signal line reset pulse φRS. In addition, the output signals which stored in the sample hold capacity Cs are read out to the horizontal signal lines 6_1 and 6_2 by the column selection pulses φH1 and φH2. Then, the horizontal signal lines 6_1 and 6_2 are reset to the horizontal signal line reset voltage VR by the horizontal signal reset pulse φRS. Then, the output signals of the column circuits 4_3 and 4_4 stored in the sample hold capacity Cs are read out to the horizontal signal lines 6_1 and 6_2 by the column selection pulses φH3 and φH4.

Aforementioned operations are repeated. Then, the signal from the column circuits are read out to the horizontal signal lines 6_1 and 6_2 sequentially, and are outputted to the output channels OUT1 and OUT2 via the output amplifiers 7_1 and 7_2. After the signals in one row are all read out, the signals in next row are read out.

Next, an operation of a ½ column thinning out mode that is thinning out and reading out electric signals of the each column circuits 4_1 to 4_4 is described with reference to FIG. 18. The operation for reading out the pixel signals and processing of the column circuits is similar to the mode for reading out all pixels shown in FIG. 17. Here, the operation for reading out the amplified pixel signals, which are stored in the sample hold capacity Cs and supplying the signals to the horizontal signal line 6_1 is described.

First, the horizontal signal lines 6_1 and 6_2 are reset to the horizontal signal line reset voltage VR by the horizontal signal line reset pulse φRS. Next, the column selection pulse φH1 is set to "H" (φH1="H"), and the signal of the column circuit 4_1 is read out to the horizontal signal line 6_1, and the signal of the column circuit 4_2 is not read out. Next, the horizontal signal lines 6_1 and 6_2 are reset to the horizontal signal line reset voltage VR by the horizontal signal line reset pulse φRS. Then, the column selection pulse φH3 is set to "H" (φH3="H"), and the signal of the column circuit 4_3 is read out to the horizontal signal line 6_1, and the signal of the column circuit 4_4 is not read out.

This operation is repeated, and the signals of the column circuits are thinned out and read out to the horizontal signal line 6_1 sequentially, the signal of the output channel OUT1 is only read out using the output amplifier 7_1. When all signals of the one column are read out, the signals of the next column are read out similarly. Here, the bias current of the output amplifier 7_2 which is not used is reduced by the mode setting section 8.

The electric signal ΔSig from the column circuits 4_1 to 4_4 is increased by (1+Cg/Cf) times. Therefore, the noises occurred after column circuits 4_1 to 4_4 are reduced, and it is possible to obtain good quality images. In addition, in the mode for thinning out the electric signal of the columns, it is possible to reduce the consumption of electric power by reducing the bias current of the output amplifier which is not used.

SUMMARY OF THE INVENTION

The present invention has an object to provide a solid-state image pickup apparatus and a solid-state image pickup method capable of reducing consumption of current when the electric signals are thinned out and read out column by column.

DETAILED DESCRIPTION OF PREFERRED EMBODIMENTS

Figure 1:
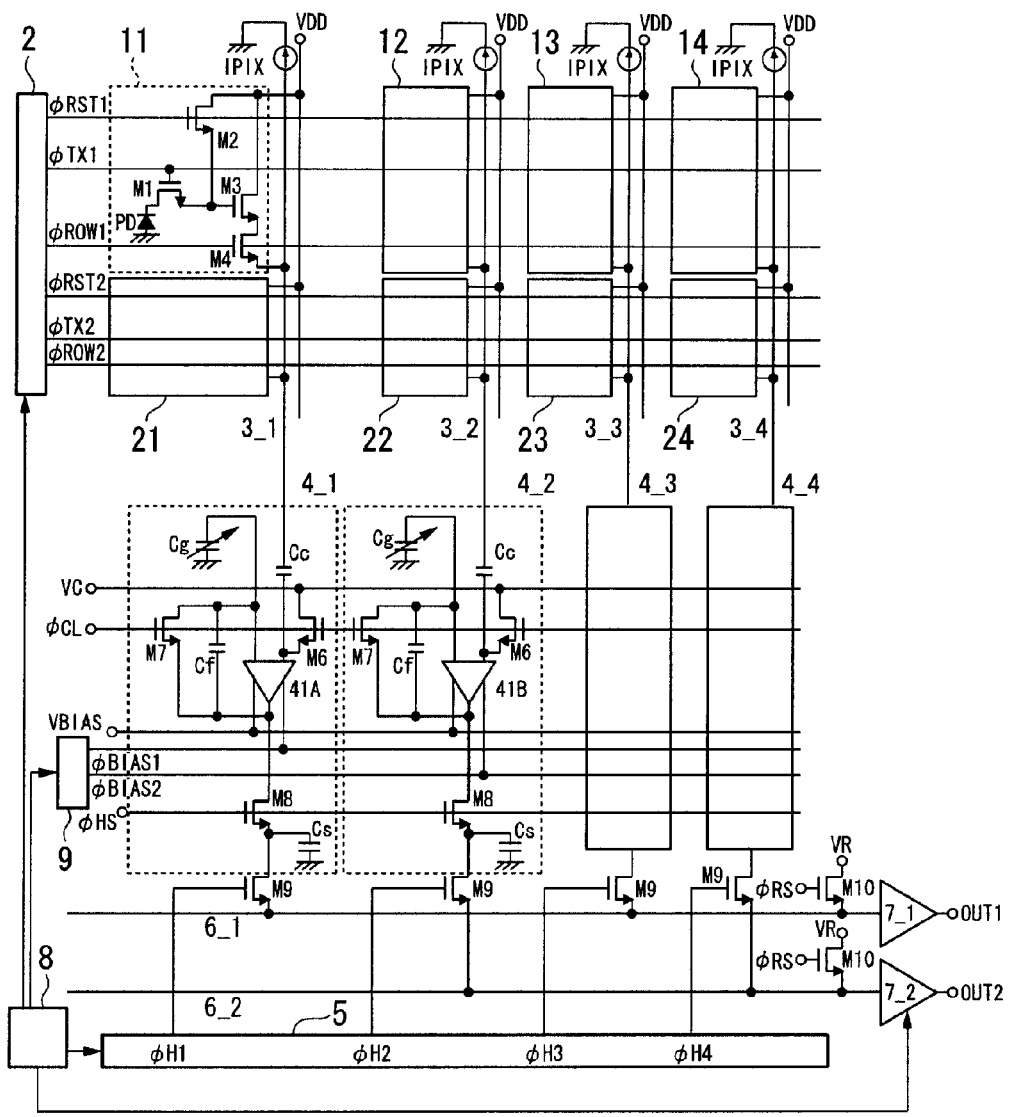
FIG. 1 is a block diagram showing a MOS type solid-state image pickup apparatus according to a first embodiment of the present invention.

Hereunder is a description of embodiments of the present invention. In the drawings which are explained below, like configurations use the same reference symbols, and redundant explanations thereof are omitted. In the timing chart, like operations use the same reference symbols of time, and redundant explanations thereof are omitted.

First Embodiment

FIG. 1 is a block diagram showing a MOS type solid-state image pickup apparatus according to a first embodiment of the present invention. The solid-state image pickup apparatus includes a vertical scanning section 2, vertical signal lines 3_1 to 3_4, a pixel bias current source IPIX, column circuits 4_1 to 4_4, a column transistor M9, horizontal scanning section 5, a horizontal signal line reset transistor M10, an output amplifiers 7_1 and 7_2, a mode setting section 8 and a column circuit current controlling section 9. The solid-state image pickup apparatus includes pixels 11 to 14 and pixels 21 to 24. The pixels 11 to 14 and the pixels 21 to 24 are also described as pixels 11 to 24.

The vertical scanning section 2 supplies pulse for reading out electric signal to the pixels 11 to 24 which are arranged in a matrix. The vertical signal lines 3_1 to 3_4 transmit the signals from the pixels 11 to 24. The pixel bias current source IPIX flows a constant current to the vertical signal lines 3_1 to 3_4. The column circuits 4_1 to 4_4 amplify and store the electric potential of the vertical signal lines 3_1 to 3_4. The column selection transistor M9 selectively outputs the signals from column circuits 4_1 to 4_4 to the horizontal signal lines 6_1 and 6_2. The horizontal scanning section 5 supplies a column selection pulse to the column selection transistor M9.

The horizontal signal line reset transistor M10 resets the horizontal signal lines 6_1 and 6_2 by the horizontal signal line reset voltage VR. The output amplifier 7_1 and the output amplifier 7_2 respectively amplify and output the signals from the horizontal signal line 6_1 and the horizontal signal line 6_2. The mode setting section 8 switches between a plurality of modes for reading out electric signal. The column circuit current controlling section 9 outputs a bias current controlling pulse φBIAS1 and φBIAS2 for controlling the bias current of the column circuits in accordance with a mode which was set by the mode setting section 8.

Each of the pixels 11 to 14 and the pixels 21 to 24 includes a photo diode PD, a transmission transistor M1, an amplification transistor M3, reset transistor M2 and a row selection transistor M4. The photo diodes of the pixels 11 to 24 each convert an input optical signal into an electric signal. The transmission transistor M1 transmits the electric signal stored in the photo diode. The amplification transistor M3 amplifies a transmitted electric signal. The reset transistor M2 resets the electric potential of the gate of the amplification transistor M3. The row selection transistor M4 selectively outputs an amplified signal based on the electric signal.

The vertical scanning section 2 supplies transmission pulses φTX1 and φTX2, reset pulses φRST1 and φRST2 and row selection pulses φROW1 and φROW2 to the gates of the transmission transistor M1, the reset transistor M2, and the row selection transistor M4 row by row. The drains of the reset transistor M2 and the amplification transistor M3 are connected to the pixel electric source VDD.

The column circuits 4_1 to 4_4 each includes column amplifiers 41A and 41B, a clamp capacity Cc, a clamp transistor M6, an amplifier reset transistor M7, an amplification capacity Cg, a sample hold capacity Cs and a sample hold transistor M8.

The column amplifiers 41A and 41B amplify the signals from the pixels 11 to 24. The clamp capacity Cc is connected to the non-inversion input terminals of the column amplifiers 41A and 41B, and clamps the output signals from the pixels 11 to 24 by the clamp voltage VC. The clamp transistor M6 supplies the clamp voltage VC to the non-inversion input terminal of the column amplifiers 41A and 41B. The feedback capacity Cf and the amplifier reset transistor M7 are connected between the inversion input terminal and the output terminal of the column amplifiers 41A and 41B. The amplification capacity Cg is connected between the inversion input terminal of the column amplifiers 41A and 41B and ground.

The amplification capacity Cg sets the amplification factor of the column circuits 4_1 to 4_4. The sample hold capacity Cs stores the output signal of the column amplifiers 41A and 41B. The sample hold transistor M8 connects output terminals of the column amplifiers 41A and 41B and the sample hold capacity Cs.

The column circuit bias current controlling voltage VBIAS is supplied to the column amplifiers 41A and 41B of the column circuits 4_1 to 4_4. The bias current controlling pulse φBIAS1 is supplied from the column circuit current controlling section 9 to the column amplifier 41A of the column circuits 4_1 and 4_3. The bias current controlling pulse φBIAS2 is supplied from the column circuit current controlling section 9 to the column amplifier 41B of the column circuits 4_2 and 4_4.

A clamp pulse φCL is supplied to the gates of the clamp transistor M6 and the amplifier reset transistor M7. A sample hold pulse φHS is supplied to the gate of the sample hold transistor M8. A corresponding pulse which is one of the column selection pulses φH1 to φH4 is supplied to the gates of each column selection transistor M9. A horizontal signal line reset pulse φRS is supplied to the gate of the horizontal signal line reset transistor M10.

In the MOS type solid-state image pickup apparatus, the column circuit 4_1 and the column circuit 4_3 output the signal to the horizontal signal line 6_1 via a corresponding column selection transistor M9. The column circuit 4_2 and the column circuit 4_4 output the signal to the horizontal signal line 6_2 via a corresponding column selection transistor M9. The output signals of the column circuit 4_1 and the column circuit 4_3 are supplied as the output channel OUT1 via the output amplifier 7_1. The output signals of the column circuit 4_2 and the column circuit 4_4 are supplied as the output channel OUT2 via the output amplifier 7_2. In other words, the output channels are separated in advance and electric signals are outputted based on whether a column is an odd column or an even column of the column circuit.

For example, a control circuit of the MOS type solid-state image pickup apparatus generates and supplies the clamp voltage VC, the clamp pulse φCL, the sample hold pulse φHS, the horizontal signal line reset voltage VR and the horizontal signal line reset pulse φRS.

Figure 2:
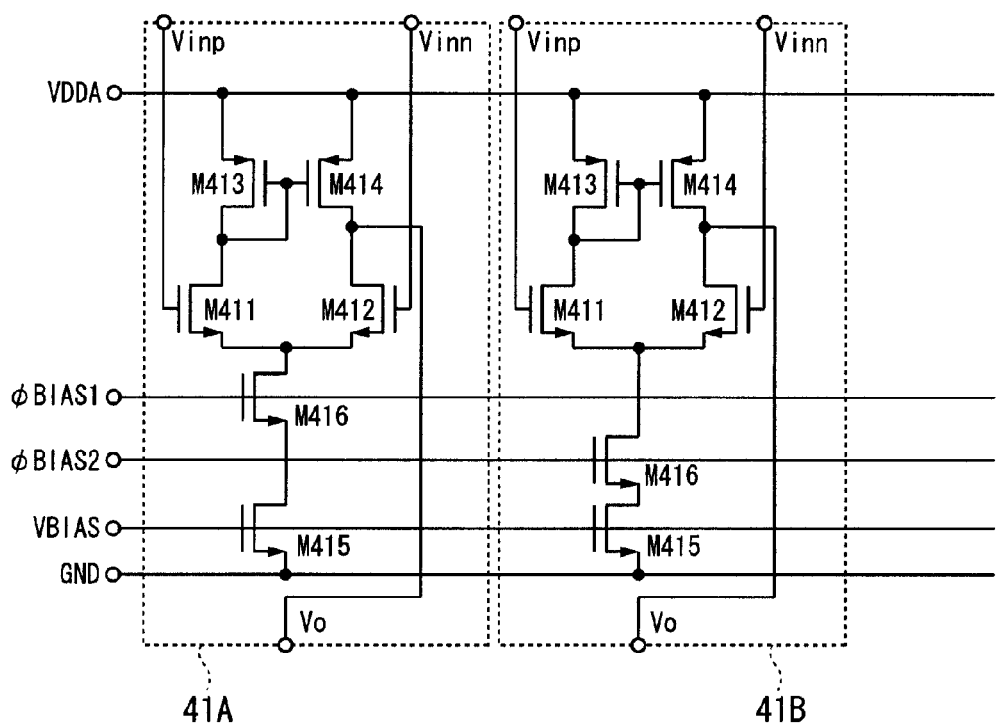
FIG. 2 is a block diagram showing configurations of the column amplifiers 41A and 41B of the MOS type solid-state image pickup apparatus according to the first embodiment.

FIG. 2 is a block diagram showing configurations of the column amplifiers 41A and 41B of the MOS type solid-state image pickup apparatus shown in FIG. 1. Each of the column amplifiers 41A and 41B includes MOS transistors M411 to M416. Here, in the MOS transistors M411 to M416, the MOS transistor M413 and the MOS transistor M414 are p-channel MOS transistors. In addition, the MOS transistors M411, M412, M415 and M416 are n-channel MOS transistors.

First, the configuration of the column amplifier 41A is described. The source of the MOS transistor M413 and the source of the MOS transistor M414 are connected to the column circuit electric source VDDA. The gate of the MOS transistor M413 and the gate of the MOS transistor M414 are connected. The drain of the MOS transistor M413 and the drain of the MOS transistor M411 are connected. First connection point, between the gate of the MOS transistor M413 and the gate of the MOS transistor 414, and second connection point, between the drain of the MOS transistor M413 and the drain of the MOS transistor M411, are connected.

The drain of the MOS transistor M414 and the drain of the MOS transistor M412 are connected. The connection point, between the drain of the MOS transistor M414 and the drain of the MOS transistor M412, is connected to the output terminal Vo. The output terminal Vo corresponds to the output terminal of the column amplifier 41A shown in FIG. 1.

The source of the MOS transistor M411 and the source of the MOS transistor M412 are connected. The connection point, between the source of the MOS transistor M411 and the source of the MOS transistor M412, is connected to the drain of the MOS transistor M416. The source of the MOS transistor M416 and the drain of the MOS transistor M415 are connected. The source of the MOS transistor M415 is connected to the column circuit reference voltage GND.

The gate of the MOS transistor M411 and the non-inversion input terminal Vinp are connected. The gate of the MOS transistor M412 and the inversion input terminal Vinn are connected. The non-inversion input terminal Vinp corresponds to the non-inversion input terminal of the column amplifier 41A or the column amplifier 41B explained in FIG. 1. The inversion input terminal Vinn corresponds to the inversion input terminal of the column amplifier 41A or the column amplifier 41B explained in FIG. 1.

The bias current controlling pulse φBIAS1 is supplied to the gate of the MOS transistor M416. The column circuit bias current controlling voltage VBIAS is supplied to the gate of the MOS transistor M415.

Next, the configuration of the column amplifier 41B is described. The configuration of the column amplifier 41B is similar to the configuration of the column amplifier 41A. Therefore, the difference between the configuration of the column amplifier 41A and 41B is described. In the column amplifier 41A, the bias current controlling pulse φBIAS1 is supplied to the gate of the MOS transistor M416. However, in the column amplifier 41B, the bias current controlling pulse φBIAS2 is supplied to the gate of the MOS transistor M416.

In the column amplifier 41A and the column amplifier 41B (FIG. 2), the bias current is supplied in accordance with gate voltage of the MOS transistor M415, and the MOS transistor M416 switches between the ON-state and the OFF-state for supplying the bias current.

Figure 3:
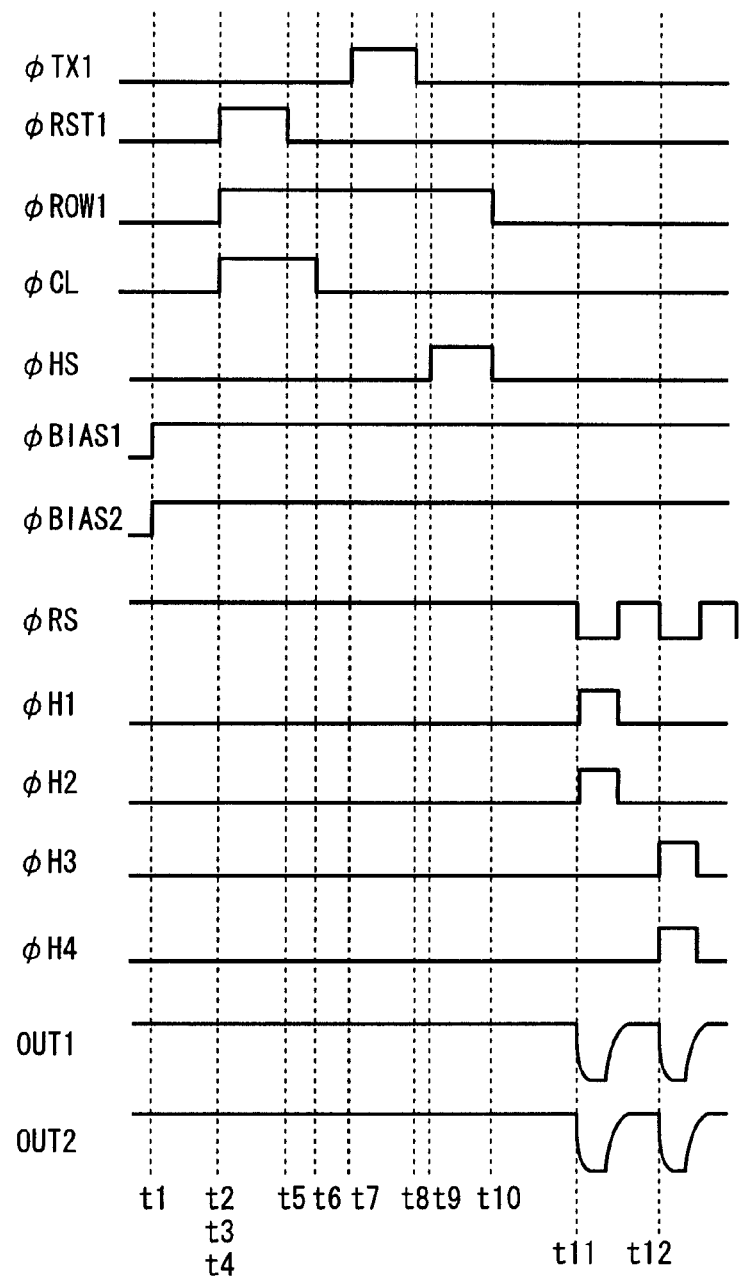
FIG. 3 is a timing chart showing an operation of reading out all pixels in the MOS type solid-state image pickup apparatus according to the first embodiment.

FIG. 3 is a timing chart showing an operation of reading out electric signals of all pixels in the MOS type solid-state image pickup apparatus according to the first embodiment.

The operation of the all-pixel reading out mode is described with reference to FIG. 3. First, the all-pixel reading out mode is set by the mode setting section 8, and the bias current controlling pulses φBIAS1 and φBIAS2 (φBIAS1="H", φBIAS2="H") are supplied from the column circuit current controlling section 9 (time t1 in FIG. 3). The vertical scanning section 2 becomes able to read out from the first row of the pixels 11 to 14. The vertical scanning section 2 sets the row selection transistor M4 to the ON-state by a row selection pulse φROW1 (φROW1="H") and reads out the output signal of the amplification transistor M3 to the vertical signal lines 3_1 to 3_4 (time t2 in FIG. 3).

Next, the reset transistor M2 is set to the ON-state by the reset pulse φRST1 (φRST1="H"), and the gate of the amplification transistor M3 is reset, the output signals in accordance with the reset electric potential of the pixels 11 to 14 are read out to the vertical signal lines 3_1 to 3_4 (time t3 in FIG. 3). Here, the clamp pulse φCL is set to "H", the amplification reset transistor M7 of the column circuits 4_1 to 4_4 is set to the ON-state, and the column circuits 4_1 to 4_4 are reset. Then simultaneously, the clamp transistor M6 is set to the ON-state, the non-inversion input terminals of the column amplifiers 41A and 41B are clamped to the clamp voltage VC (time t4 in FIG. 3).

Next, after the reset pulse φRST1 is set to "L" (time t5 in FIG. 3), the clamp pulse φCL is also set to "L", and clamp processing is finished (time t6 in FIG. 3). Then, the transmission pulse φTX1 is set to "H", and the transmission transistor M1 is set to the ON-state (time t7 in FIG. 3). Then, the electric signal involved in the optical signal which occurred in the photo diode PD is transmitted to the gate of the amplification transistor M3, and the transmission pulse φTX1 is set to "L" (time t8 in FIG. 3).

The amplified signals of electric signals involved in the optical signals in the each pixel is supplied to the vertical signal lines 3_1 to 3_4. The non-inversion input terminals of the column amplifiers 41A and 41B are changed, by the clamp capacity Cc, variation ΔSig based on the electric signal involved in the optical signal from the reset electric potential of the pixels 11 to 14. Here, the output signals of the column amplifiers 41A and 41B are each changed (1+Cg/Cf)ΔSig compared to the clamp voltage VC. Then, the sample hold pulse φHS is set to the "H" (time t9 in FIG. 9). Then, the read out signals from the column amplifiers 41A and 41B are read out to the sample hold capacity Cs, and the sample hold pulse φHS is set to the "L" and is stored (time t10 in FIG. 3).

Finally, the horizontal signal lines 6_1 and 6_2 are reset to the horizontal signal line reset voltage VR by the horizontal signal line reset pulse φRS. Then, the output signals, which were stored in the sample hold capacity Cs, of the column circuits 4_1 and 4_2 are read out to the horizontal signal lines 6_1 and 6_2 by the column selection pulses φH1 and φH2 (time t11 in FIG. 3). Then, the horizontal signal lines 6_1 and 6_2 are reset to the horizontal signal line reset voltage VR by the horizontal signal line reset pulse φRS. Then, the output signals, which were stored in the sample hold capacity Cs, of the column circuits 4_3 and 4_4 are read out to the horizontal signal lines 6_1 and 6_2 by the column selection pulses φH3 and φH4 (time t12 in FIG. 3).

This process is repeated, and the signals from the column circuits are read out to the horizontal signal lines 6_1 and 6_2 sequentially, and supplied from the output channels OUT1 and OUT2 via the output amplifiers 7_1 and 7_2. After all signals of one row are read out, the signals of next row are read out similarly.

Next, an operation of a ½ column thinning out mode which thins out and reads out the electric signal from the each column circuits 4_1 to 4_4 is described with reference to the timing chart of FIG. 4. First, the mode setting section 8 sets the ½ column thinning out mode, and the bias current controlling pulses φBIAS1 (φBIAS1="H") and φBIAS2 (φBIAS2="L") are supplied from the column circuit current controlling section 9 (time t1 in FIG. 4). In this case, the MOS transistor M416 of the column circuits 4_2 and 4_4 is set to the OFF-state by the bias current controlling pulse φBIAS2 (φBIAS="L"). Therefore, the current is not going to flow in the circuit amplifier 41B of the column circuits 4_2 and 4_4. The vertical scanning section 2 becomes able to read out the signals from the first row of the pixels 11 to 14. Then, the row selection transistor M4 is set to the ON-state by the row selection pulse φROW1 (φROW1="H") the output signals of the amplification transistor M3 are each read out to the vertical signal lines 3_1 to 3_4 (time t2 in FIG. 4).

Next, the reset transistor M2 is set to the ON-state by the reset pulse φRST1 (φRST1="H"), and the gate of the amplification transistor M3 is reset to the reset electric potential. Then, the output signals, in response to the reset electric potential of the pixels 11 to 14, are each read out to the vertical signal lines 3_1 to 3_4 (time t3 in FIG. 4). Here, the clamp pulse φCL is set to "H", the amplifier reset transistor M7 of the column circuits 4_1 to 4_4 are set to the ON-state, and column circuits 4_1 to 4_4 is reset. Then simultaneously, the clamp transistor M6 is set to the ON-state, the non-inversion input terminal of the column amplifier 41A is clamped to the clamp voltage (time t4 in FIG. 4).

Figure 4:
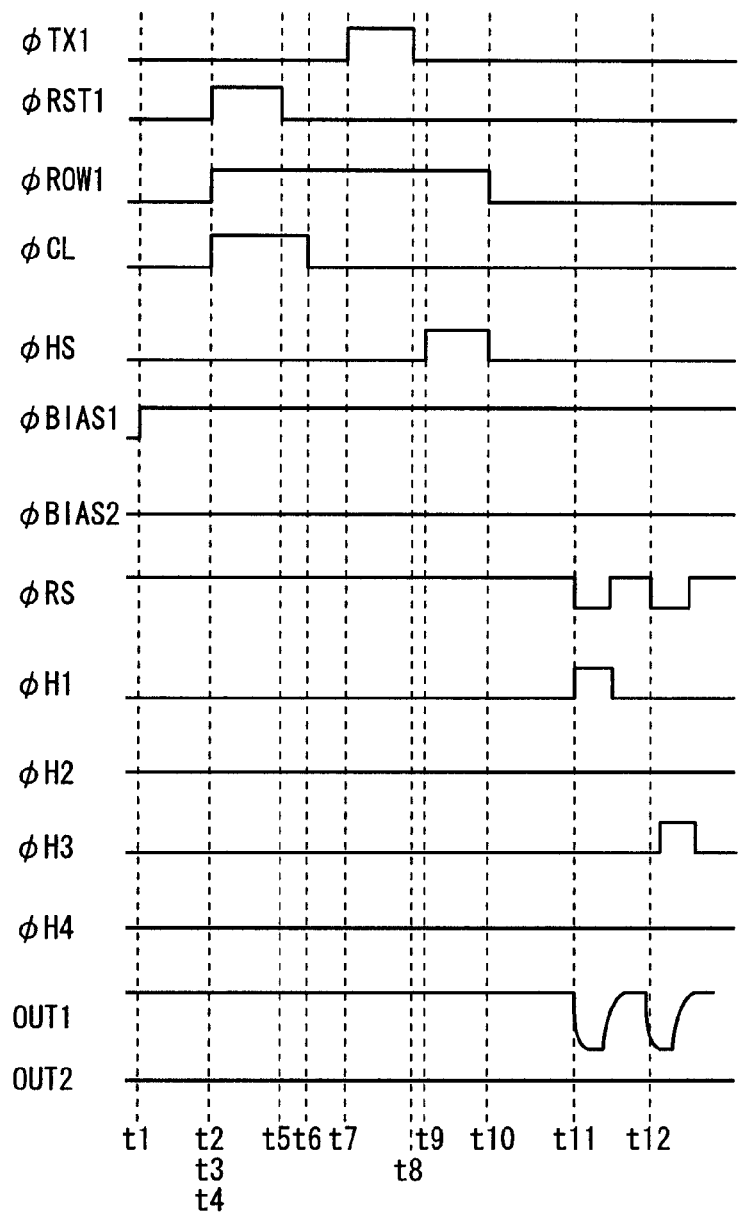
FIG. 4 is a timing chart showing an operation of thinning out and reading out electric signal in the MOS type solid-state image pickup apparatus according to the first embodiment.

After the reset pulse φRST is set to "L" (time t5 in FIG. 4), the clamp pulse φCL is set to "L", and clamp processing is finished (time t6 in FIG. 4). Then, the transmission pulse φTX1 is set to "H", and the transmission transistor M1 is set to the ON-state (time t7 in FIG. 4). Then, the electric signals involved in the optical signals which occurred in the photo diode PD are transmitted to the gate of the amplification transistor M3, and the transmission pulse φTX1 is set to "L" (time t8 in FIG. 4). The amplified signals of the electric signals involved in the optical signals of each pixels are supplied to the vertical signal lines 3_1 to 3_4. The non-inversion input terminal of the column amplifier 41A changes, by the clamp capacity Cc, variation ΔSig according to the electric signals involve in the optical signals from the reset electric potential of the pixels 11 to 14. Here, the output signal of the column amplifier 41A changes (1+Cg/Cf)ΔSig compared to the clamp voltage VC. Then, the sample hold pulse φHS is set to "H" (time t9 in FIG. 4). Then, the read out signal from the column amplifier 41A is read out to the sample hold capacity Cs, and is stored as the sample hold pulse φHS (φHS="L") (time t10 in FIG. 4).

Finally, the horizontal signal lines 6_1 and 6_2 are reset to the horizontal signal line reset voltage VR by the horizontal signal line reset pulse φRS. Then, the column selection pulse φH1 is set to "H", and the signals from the column circuit 4_1 are read out to the horizontal signal line 6_1, and the signal from the column circuit 4_2 is not read out (time t11 in FIG. 4).

Next, the horizontal signal lines 6_1 and 6_2 are reset to the horizontal signal line reset voltage VR by the horizontal signal line reset pulse φRS. Then the column selection pulse φH3 is set to "H", and the signal from the column circuit 4_3 is read out, and the signal from the column circuit 4_4 is not read out (time t12 in FIG. 4).

This process is repeated, and the signals from the column circuits are thinned out and read out to the horizontal signal line 6_1 sequentially, the signals from the output channel OUT1 are read out using the output amplifier 7_1. After the signals of the one column are all read out, the signals of the next column are read out similarly.

It is possible to reduce the harmful effects of noise which occurred after the column circuits 4_1 to 4_4, and is possible to obtain good quality of images, because the electric signal ΔSig from each pixel is increased by (1+Cg/Cf) times by the column circuits 4_1 to 4_4. In addition, in the ½ column thinning out mode, the column circuit current controlling section 9 able to reduce the bias current of the column circuit which is not used, and able to reduce the consumption of electric power easily.

As described in FIG. 1 to FIG. 4, the solid-state image pickup apparatus includes pixels section which a plurality of unit pixels (pixels 11 to 24) are arranged in a matrix. A plurality of pixels (pixels 11 to 24) converts an input optical signal to an electric signal. In addition, the solid-state image pickup apparatus includes a plurality of column circuits (column circuits 4_1 to 4_4) which perform signal processing to the electric signals from the pixel section column by column. In addition, the solid-state image pickup apparatus includes the column circuit current controlling section 9 which reduces a first current which flows in column circuit, whose electric signal is not read out, among a plurality of column circuits than second current which flows in column circuit which is read out electric signal among a plurality of column circuits, when the mode which thins out and reads out electric signal column by column is set.

Then, the column circuit current controlling section 9 of the solid-state image pickup apparatus reduces the current which flows in column circuit, whose electric signal is not read out, than the current which flows in the column circuit which is read out electric signal, when the mode which thins out and reads out the electric signals. For example, the column circuit current controlling section 9 of the solid-state image pickup apparatus controls the current which flows in column circuit, whose electric signal is not read out, to zero, when the mode which thins out and reads out electric signals column by column is set. Therefore, it is possible to reduce current which flows in column circuit, whose electric signal is not read out. Therefore, if the mode which thins out each of a plurality of columns and reads out an electric signal is set, it is possible to further reduce the consumption of electric power.

In addition, a plurality of circuits each include amplification circuit (column amplifiers 41A and 41B) which amplifies electric signal from pixel section electrically. The number of the amplification circuits is large, therefore, generally, the consumption of electric power is high. Therefore, the column circuit current controlling section 9 reduces the current which flows in the column circuit, whose electric signal is not read out, when the mode which thins out each of a plurality of columns and reads out electric signal is set. Therefore, it is possible to reduce the consumption of electric power in the column circuit which has a high consumption of electric power. Also, it is possible to further reduce the consumption of electric power, when the mode which thins out each of a plurality of columns and reads out an electric signal is set.

In addition, the column circuit includes a switch element (MOS transistor M416 in FIG. 2) which switches between the ON-state and the OFF-state of the bias current of the column circuit. Then, the column circuit current controlling section 9 controls each switch element based on whether a column circuit is read out or not read out electric signal. Therefore, the column circuit current controlling section 9 is able to reduce the current which flows in column circuit, whose electric signal is not read out, than the current which flows in column circuit which is read out electric signal, when the mode which thins out each of a plurality of columns and reads out an electric signal is set.

In addition, the solid-state image pickup apparatus includes the mode setting section 8 which switches between a first mode, which thins out each of a plurality of columns of column circuits and reads out the electric signals, and a second mode, which reads out electric signal from all columns of column circuits. Therefore, the solid-state image pickup apparatus is able to switch between a first mode, which thins out each of a plurality of columns and reads out electric signal, and a second mode, which reads out electric signal from all column circuits, and consumption of electric power can be reduced by the column circuit current controlling section 9, when the mode which thins out each of a plurality of columns and reads out electric signal is set. Therefore, when the mode which thins out each of a plurality of columns among column circuits and reads out an electric signal is set, it is able to reduce the consumption of electric power, than mode which reads out electric signals from all columns among column circuits.

Figure 5:
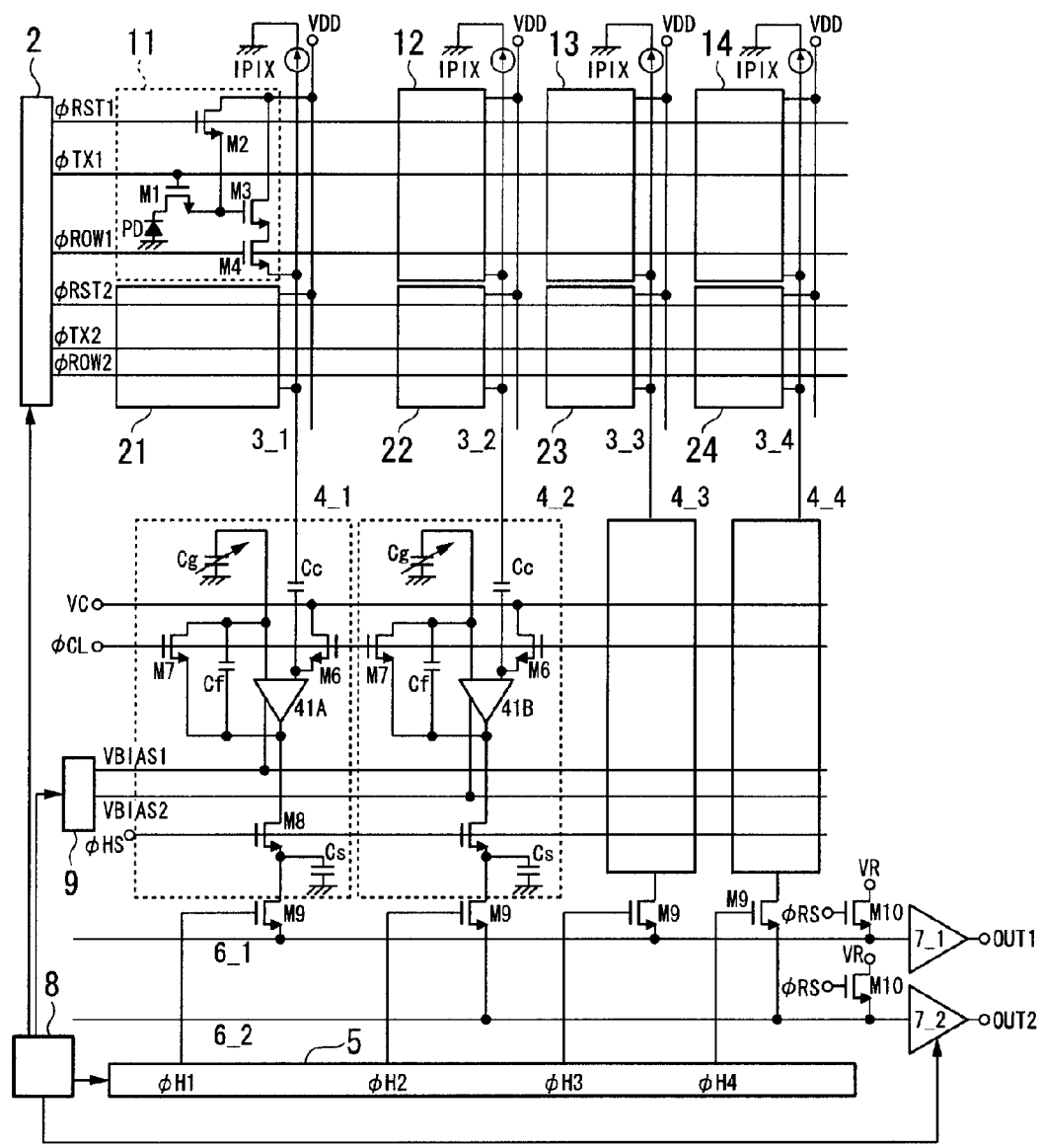
FIG. 5 is a block diagram showing a MOS type solid-state image pickup apparatus according to a second embodiment of the present invention.

For example, the column circuit current controlling section 9 controls that the current, which flows in column circuit, whose electric signal is not read out, is equals to the current, which flows in column circuit which is read out electric signal, when the mode which reads out electric signals from all columns among column circuits is used Second Embodiment Next, a second embodiment of the present invention is described with reference to FIG. 5 and FIG. 6. FIG. 5 is a block diagram showing a MOS type solid-state image pickup apparatus according to the second embodiment. In FIG. 5 according to the second embodiment, in contrast to the first embodiment shown in FIG. 1, the output signal from the column circuit current controlling section 9 is column circuit bias current controlling voltages VBIAS1 and VBIAS2. In addition, the column circuit bias current controlling voltage VBIAS1 is supplied to the column amplifier 41A of the column circuits 4_1 and 4_3. In addition, the column circuit bias current controlling voltage VBIAS2 is supplied to the column amplifier 41B of the column circuits 4_2 and 4_4. Other configurations according to the second embodiment are similar to the configurations of the first embodiment, therefore their explanations are omitted.

Figure 6:
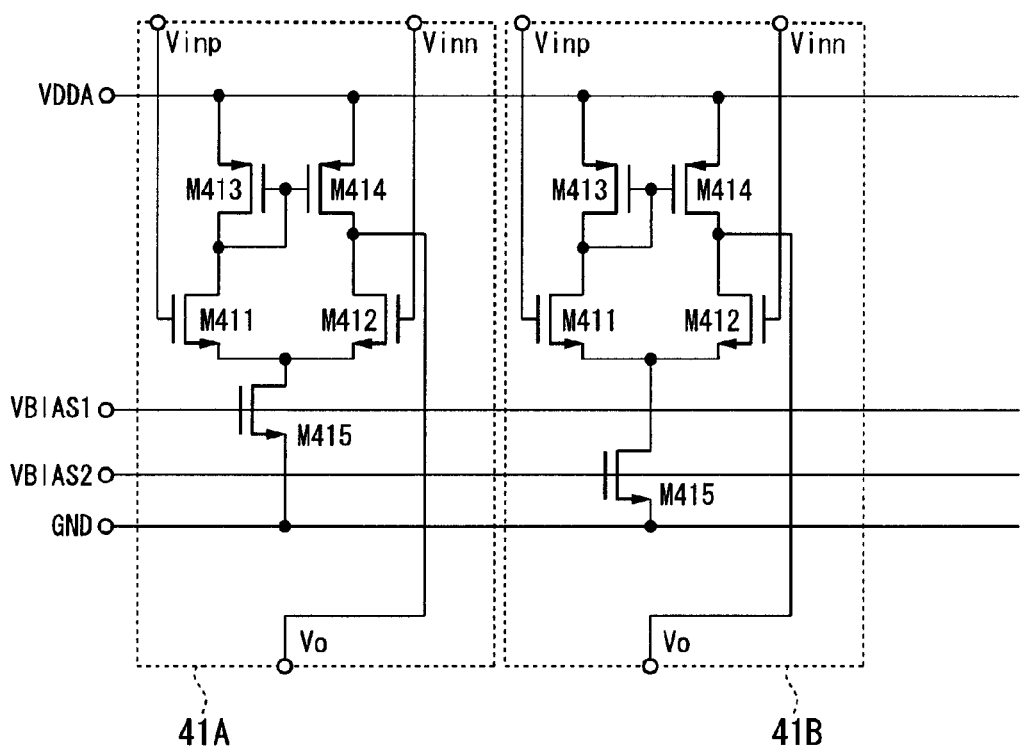
FIG. 6 is a block diagram showing configurations of the column amplifiers 41A and 41B of the MOS type solid-state image pickup apparatus according to the second embodiment.

FIG. 6 is a block diagram showing configurations of the column amplifiers 41A and 41B (shown in FIG. 5) of the MOS type solid-state image pickup apparatus according to the second embodiment. The column amplifiers 41A and 41B include MOS transistors M411 to M415. The connection between the MOS transistors M411 to M414 according to the second embodiment shown in FIG. 6 is similar to the connection between the MOS transistor M411 to M414 according to the first embodiment shown in FIG. 2.

However, it is different that the connection point between the source of the MOS transistor M411 and the source of the MOS transistor 412 connects to the drain of the MOS transistor M415. In addition, in the column amplifier 41A, it is different that the column circuit bias current controlling voltage VBIAS1 is supplied to the gate of the MOS transistor M415. In addition, in the column amplifier 41B, it is different that the column circuit bias current controlling voltage VBIAS2 is supplied to the gate of the MOS transistor M415.

As described in FIG. 5 and FIG. 6, in the second embodiment, the bias voltage lines, which supply the bias current to the column circuit, are separated in advance based on whether electric signal of column circuit is read out or is not read out. For example, the bias voltage lines are separated to the column circuit bias current controlling voltage VBIAS1 and the column circuit bias current controlling voltage VBIAS2. Then, the column circuit current controlling section 9 each controls the voltage which is supplied to the bias voltage line.

Also, in the second embodiment, the column circuit current controlling section 9 reduces the column circuit bias current controlling voltage VBIAS2, when the mode setting section 8 sets the ½ column thinning out mode. Therefore, it is possible to reduce the bias current of the column amplifier 41B of the column circuits 4_2 and 4_4 which are not read out electric signals.

Also, in the second embodiment, the electric signals of each pixel is amplified by the column circuits 4_1 to 4_4. Therefore, it is possible to reduce the harmful effects of noise which occurred after the column circuits 4_1 to 4_4, and it is possible to obtain good quality images. In addition, in the ½ column thinning out mode, it is possible to reduce the consumption of current by the column circuit current controlling section 9, by reducing the bias current in column circuit which is not used, with simple control and fewer lines.

In addition, in contrast to the first embodiment, in the column amplifiers 41A and 41B according to the second embodiment, it is possible to reduce the number of transistors. In other words, in the first embodiment, six MOS transistors M411 to M416 are necessary, but in the second embodiment, five MOS transistors M411 to M415 are necessary.

In addition, in the second embodiment, in contrast to the first embodiment, it is possible to reduce the number of the signal lines. In other words, in the first embodiment, the column circuit bias current controlling voltage VBIAS and the bias current controlling pulses φBIAS1 and φBIAS2 are necessary. In contrast to the first embodiment, in the second embodiment, the column circuit bias current controlling voltages VBIAS1 and VBIAS2 are necessary.

As described above, in the second embodiment in contrast to the first embodiment, it is possible to reduce the number of the transistors in the column amplifiers 41A and 41B. In addition, it is possible to reduce the number of the lines which control the bias of column circuit, and it is possible to lessen the number of controlling processes. Therefore, it is possible to decrease the area which is provide with a chip, and it is possible to reduce the cost of the circuit entirely.

Third Embodiment

Figure 7:
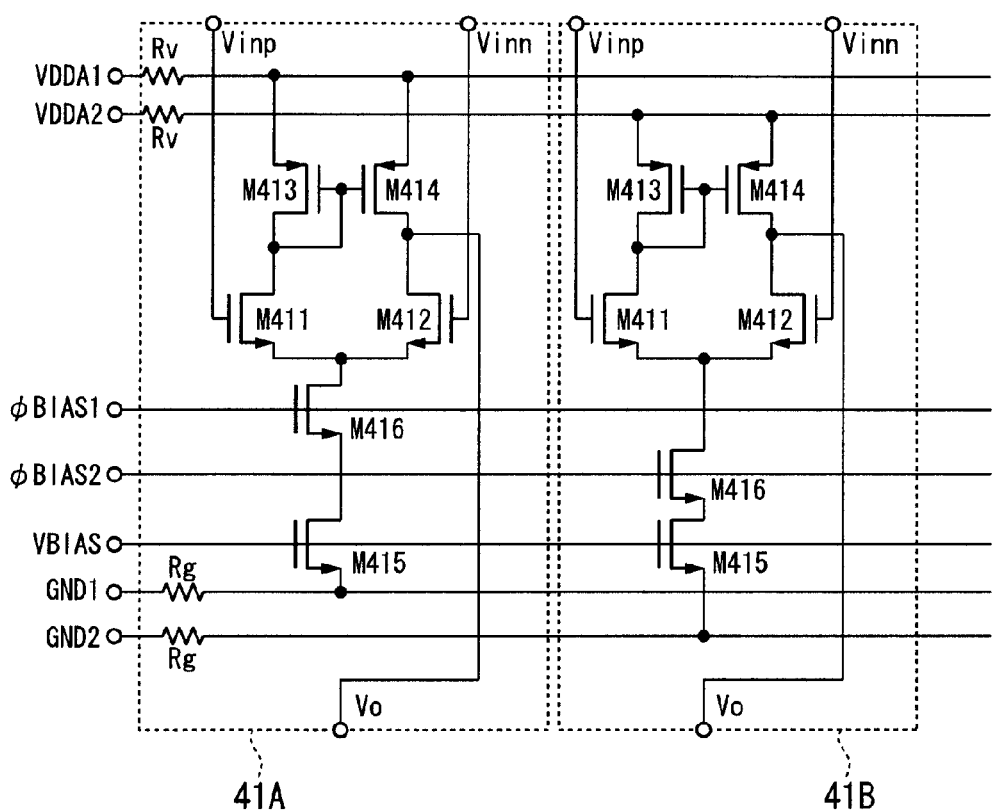
FIG. 7 is a block diagram showing configurations of the column amplifiers 41A and 41B of the MOS type solid-state image pickup apparatus according to a third embodiment of the present invention.

FIG. 7 is a block diagram showing configurations of the column amplifiers 41A and 41B of the MOS type solid-state image pickup apparatus according to a third embodiment of the present invention. Configurations of the column amplifiers 41A and 41B according to the third embodiment are changed in part of the column amplifiers 41A and 41B according to the first embodiment shown in FIG. 2. In addition, other configurations according to the third embodiment are similar to the configurations of the first embodiment, therefore their explanations are omitted.

The column amplifiers 41A and 41B shown in FIG. 7 include MOS transistors M411 to M416, and are supplied bias current in response to the gate voltage of the MOS transistor M415. The MOS transistor M416 switches between the ON-state and the OFF-state for supplying the bias current in the column amplifiers 41A and 41B. The source of the MOS transistors M413 and M414 of the column amplifier 41A is connected to the column circuit electric source VDDA1. The source of the MOS transistors M413 and M414 of the column amplifier 41B is connected to the column circuit electric power source VDDA2. The source of the MOS transistor M415 of the column amplifier 41A is connected to the column circuit reference voltage GND1. The source of the MOS transistor M415 of the column amplifier 41B is connected to the column circuit reference voltage GND2. The gate of the MOS transistor M416 of the column amplifier 41A is supplied the bias current controlling pulse φBIAS1. The gate of the MOS transistor M416 of the column amplifier 41B is supplied the bias current controlling pulse φBIAS2.

In the column amplifiers 41A and 41B shown in FIG. 7, the line resistance Rg results from the lines of the column circuit reference voltages GND1 and GND2. In addition, the line resistance Rv results from the lines of the lines of the column circuit electric source VDDA1 and VDDA2. In column amplifiers 41A and 41B, the values of the line resistance Rg and the line resistance Rv are equal.

In the first embodiment, the electric source line (the line of the column circuit electric source VDD), which supplies power to the column circuit, and reference voltage line (the column circuit reference voltage GND), which supplies the reference voltage to the column circuit, are shared by the column circuit whose electric signal is not read out and the column circuit whose electric signal is read out.

However, in the third embodiment, the electric source line (the line of the column circuit electric sources VDDA1 and VDDA2), which supply the power to the column circuit, and the reference voltage line (the lines of the column circuit reference voltages GND1 and GND2) are separated by the column circuit whose electric signal is not read out and the column circuit whose electric signal is read out.

In the solid-state image pickup apparatus shown in FIG. 7, the ½ column thinning out mode is set, and the bias current controlling pulse φBIAS2 is set to "L". Then, if an current does not flow in the column amplifier 41B, the current which flows in the column circuit electric source VDDA1, which is connected to the column amplifier 41A, and line of the column circuit reference voltage GND1 does not change. Therefore, voltage fluctuation based on the line resistance Rv of the column circuit electric source VDD1 which is connected to the column amplifier 41A and the line resistances Rg of the column circuit reference voltage GND1 of the all-pixel reading out mode and the ½ column thinning out mode are the same.

Also, in the third embodiment, electric signals from each pixels are amplified by the column circuits 4_1 to 4_4, and the noise which occurred after the column circuits 4_1 to 4_4 are reduced, and it is possible to obtain good quality images. In addition, in the ½ column thinning out mode, the column circuit current controlling section 9 is easily able to reduce the consumption of electric source by reducing the bias current in the column circuit which is not used. In addition, it is possible to reduce the voltage fluctuation, which is based on reducing the bias current of the column circuit in the ½ column thinning out mode, based on the line resistance of the column circuit electric source and line resistance of the column circuit reference voltage.

Fourth Embodiment

Figure 8:
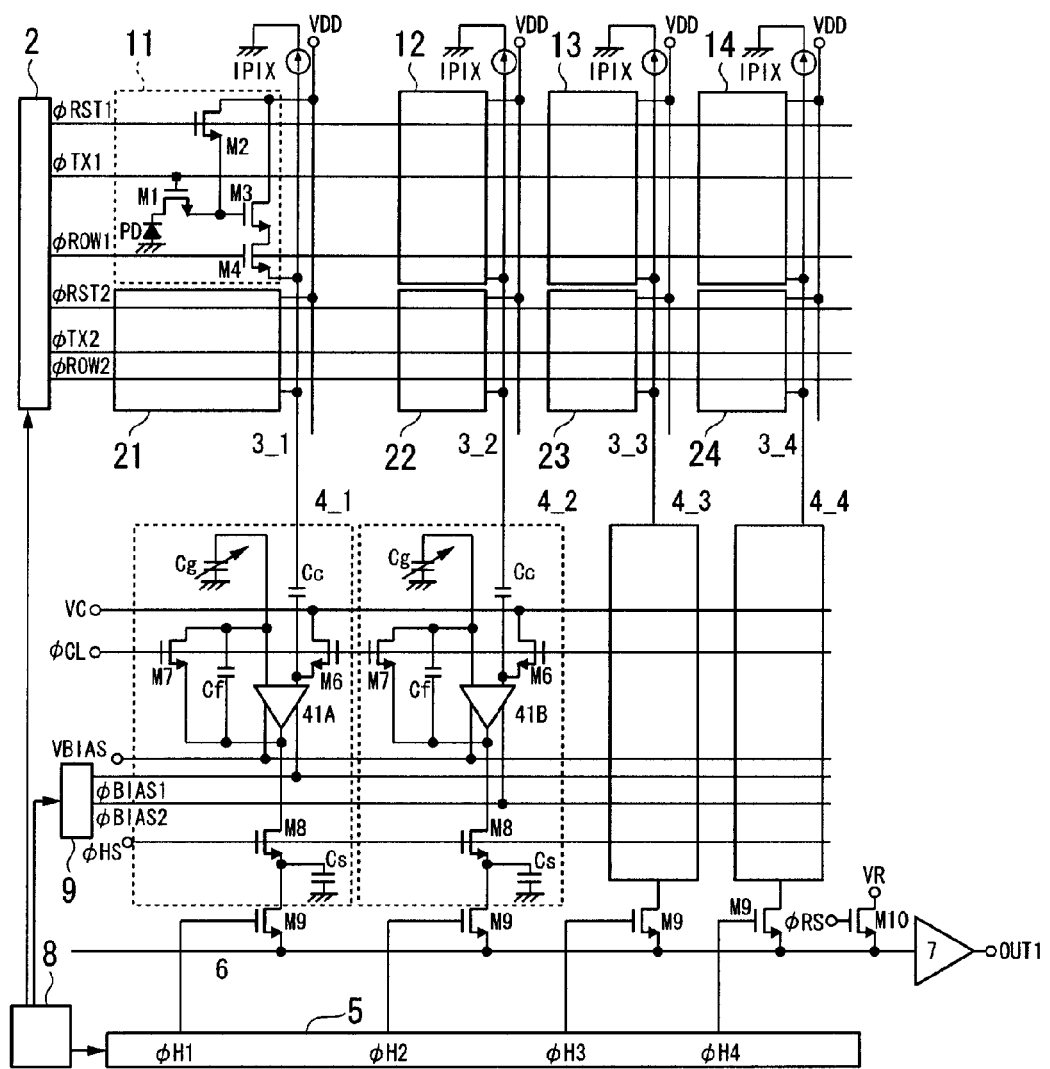
FIG. 8 is a block diagram showing a MOS type solid-state image pickup apparatus according to a forth embodiment of the present invention.

FIG. 8 is a block diagram showing a MOS type solid-state image pickup apparatus according to a forth embodiment of the present invention. In the fourth embodiment, the horizontal signal line 6_2, the output amplifier 7_2 and the output channel OUT2 are omitted from the configurations of the first embodiment shown in FIG. 1. In addition, the horizontal signal line 6 shown in FIG. 8 corresponds to the horizontal signal line 6_1 shown in FIG. 1, and the output amplifier 7 corresponds to the output amplifier 7_1 shown in FIG. 1.

In the MOS type solid-state image pickup apparatus, the column circuits 4_1 to 4_4 supply the signals to the horizontal signal line 6 via corresponding column selection transistor M9. Then, the output signals of the column circuits 4_1 to 4_4 are outputted as the output channel OUT1 via the output amplifier 7. In other words, the output channels are not separated, and both odd column and even column outputs signals.

In the first embodiment, the output channels are separated and outputted different output channels whether odd column or even column. In contrast to the first embodiment, in the fourth embodiment, the output channels are not separated, and both odd column and even column outputs signals via same output channel. Other configurations according to the fourth embodiment are similar to the configurations of the first embodiment, therefore their explanations are omitted. In addition, the configurations of the column amplifiers 41A and 41B according to the fourth embodiment are similar to the configurations of the column amplifiers 41A and 41B according to the first embodiment shown in FIG. 2.

Figure 9:
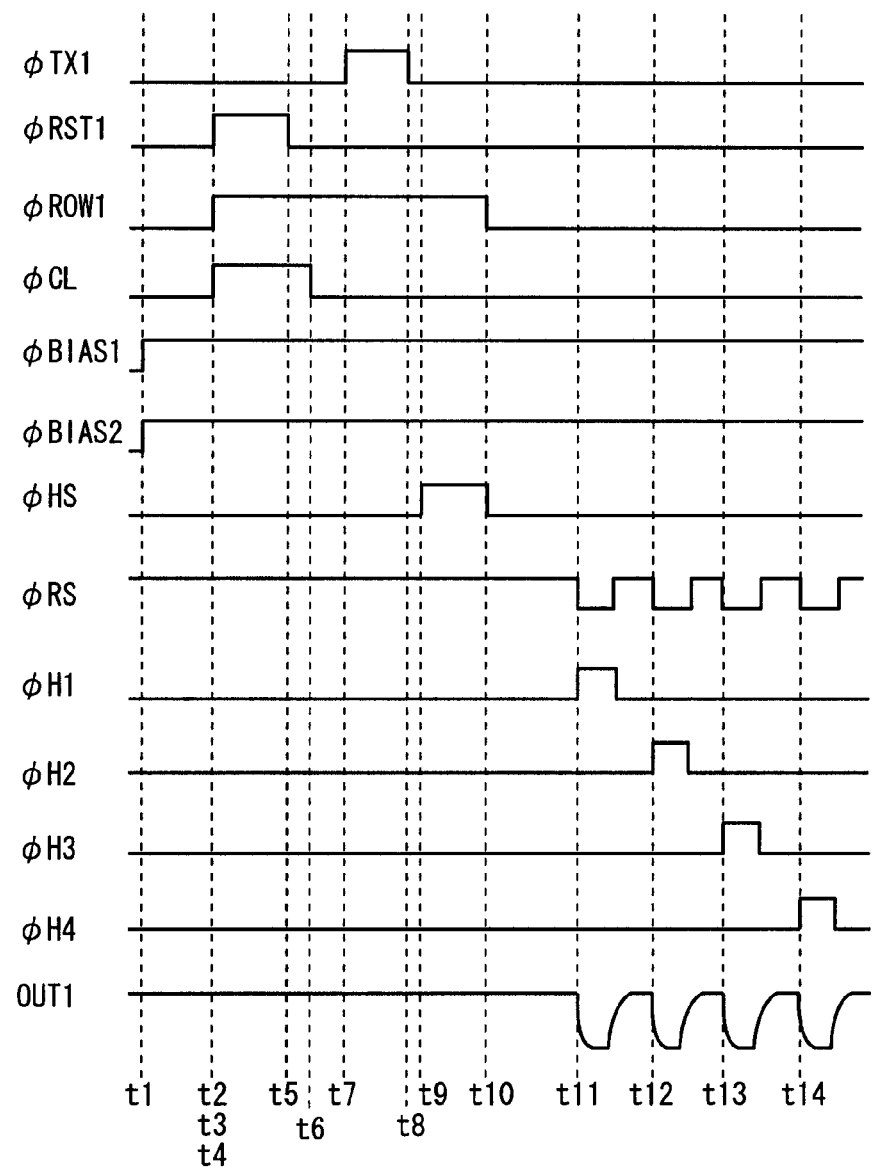
FIG. 9 is a timing chart showing an operation of reading out electric signals from all pixels in the MOS type solid-state image pickup apparatus according to the forth embodiment.

FIG. 9 is a timing chart showing an operation of reading out all pixels in the MOS type solid-state image pickup apparatus according to the forth embodiment. The operations of the reading out the pixel signals and the column circuits 4_1 to 4_4 (operations during times t1 to t10 in FIG. 9) are similar to the operations in the all-pixel reading out mode according to the first embodiment shown in FIG. 3. Here, the operation of reading out the amplified pixel signal, which was stored in the sample hold capacity Cs, to the horizontal signal line 6 (operation after time t11 in FIG. 9) is described.

First, the horizontal signal line 6 is reset to the horizontal signal line reset voltage VR by the horizontal signal line reset pulse φRS. Then, the output signal which was stored in the sample hold capacity Cs is read out to the horizontal signal line 6 by the column selection pulse φH1 (time t11 in FIG. 9). Then, the horizontal signal line 6 is reset to the horizontal signal reset voltage VR by the horizontal signal line reset pulse φRS. Then, the output signal of the column circuit 4_2 which was stored in the sample hold capacity Cs is read out to the horizontal signal line 6 by the column selection pulse φH2 (time t12 in FIG. 9).

Next, the horizontal signal line 6 is reset to the horizontal signal line reset voltage VR by the horizontal signal line reset pulse φRS. Then, the output signal of the column circuit 4_3 which was stored in the sample hold capacity Cs is read out to the horizontal signal line 6 by the column selection pulse φH3 (time t13 in FIG. 9). Then, the horizontal signal line 6 is reset to the horizontal signal line reset voltage VR by the horizontal signal line reset pulse φRS. Then, the output signal of the column circuit 4_4 which was stored in the sample hold capacity Cs is read out to the horizontal signal line 6 by the column selection pulse φH4 (time t14 in FIG. 9).

This process is repeated, and the signals of the each column circuit are read out to the horizontal signal lines 6 sequentially and the signals are outputted to the output amplifier 7 via the output channel OUT1. After the signals of the one column are all read out, the signals of the next column are read out.

Figure 10:
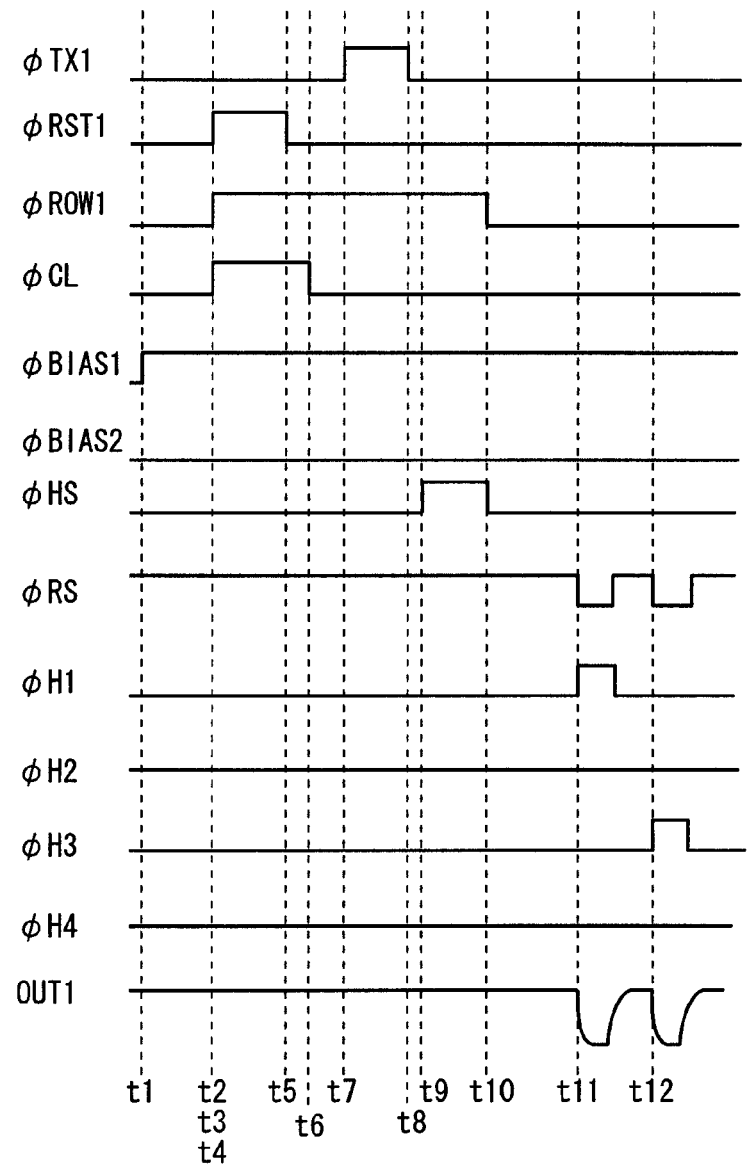
FIG. 10 is a timing chart showing an operation of thinning out and reading out electric signals in the MOS type solid-state image pickup apparatus according to the forth embodiment.

FIG. 10 is a timing chart showing an operation of the ½ column thinning out and reading out mode which thins out and reads out from each of the column circuits 4_1 to 4_4 according to the forth embodiment of the present invention. The operation of the reading out the pixel signals and the column circuits 4_1 to 4_4 (operations during times t1 to t10 in FIG. 10) are similar to the operations in the all-pixel reading out mode according to the first embodiment shown in FIG. 4. Here, the operation of reading out the amplified pixel signal, which was stored in the sample hold capacity Cs, to the horizontal signal line 6 (operation after time t11 in FIG. 10) is described.

First, the horizontal signal line 6 is reset to the horizontal signal line reset voltage VR by the horizontal signal line reset pulse φRS. Then, the output signal which was stored in the sample hold capacity Cs is read out to the horizontal signal line 6 by the column selection pulse φH1 (time t11 in FIG. 10). Then, the horizontal signal line 6 is reset to the horizontal signal reset voltage VR by the horizontal signal line reset pulse φRS. Then, the output signal of the column circuit 4_3 which was stored in the sample hold capacity Cs is read out to the horizontal signal line 6 by the column selection pulse φH3 (time t12 in FIG. 10). This process is repeated, and the signals of the each column circuit are read out to the horizontal signal line 6 sequentially and are outputted to the output amplifier 7 via the output channel OUT1. After the signals of one column are all read out, the signals of the next column are read out. In addition, when the ½ column thinning out and reading out mode is set, the column circuit current controlling section outputs the bias current controlling pulse BIAS2 (BIAS2="L"), and reduces the bias current of the column amplifier 41B of the column circuits 4_2 and 4_4.

In the fourth embodiment, when using a horizontal signal line, the output amplifier and the output channel are same between the all-pixel reading out mode and the ½ column thinning out and reading out mode, it is possible to reduce the consumption of current in the ½ column thinning out and reading out mode. In this case, it is possible to shorten the time required to read out signals in the column thinning out mode than the all-pixel reading out mode.

In addition, the time of reading out the amplified pixel signal which was stored in the sample hold capacity Cs to the horizontal signal line 6 in the all-pixel reading out mode according to the fourth embodiment explained in FIG. 9 is two times more than the time of the operation according to the first embodiment explained in FIG. 3. In other words, in the all-pixel reading out mode according to the first embodiment explained in FIG. 3, the time between time t11 and time t12 shown in FIG. 3 is necessary. In contrast to the first embodiment, in the all-pixel reading out mode according to the fourth embodiment explained in FIG. 9, the time between time t11 and time t4 shown in FIG. 9 is necessary.

However, in the fourth embodiment, the output channels are not separated and both odd column and even column outputs signals via same output channel. Therefore, the circuit configuration becomes simple, and it is possible to reduce the cost. Then, in the thinning out and reading out mode, the reading out time is necessary and is equal to that of the first embodiment.

Fifth Embodiment

Figure 11:
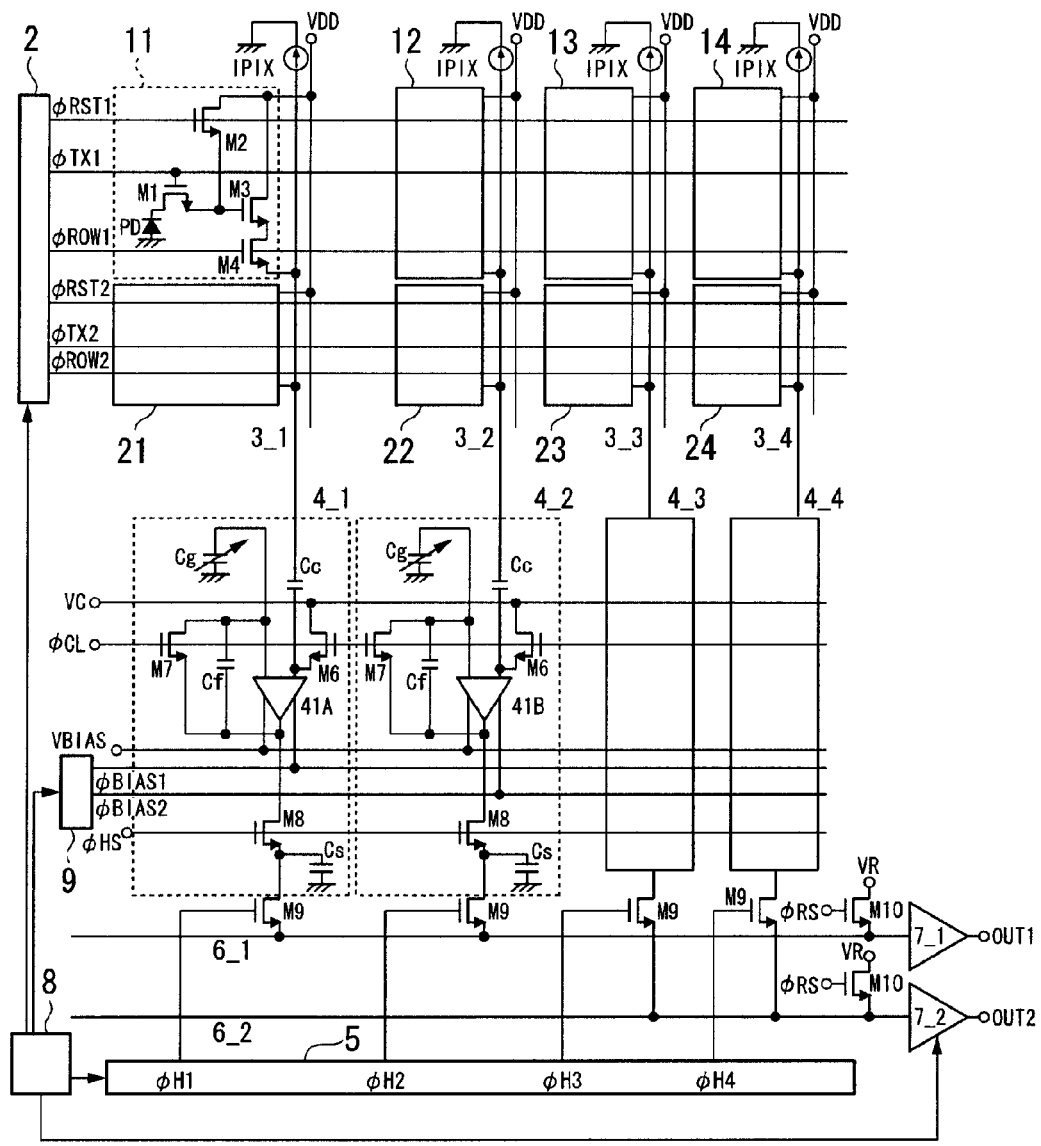
FIG. 11 is a block diagram showing a MOS type solid-state image pickup apparatus according to a fifth embodiment of the present invention.

FIG. 11 is a block diagram showing a MOS type solid-state image pickup apparatus according to a fifth embodiment of the present invention. In the first embodiment shown in FIG. 1, the column circuits 4_1 and 4_3 output signals to the horizontal signal line 6_1 via corresponding the column selection transistor M9. In addition, the column circuits 4_2 and 4_4 output signals to the horizontal signal line 6_2 via corresponding the column selection transistor M9. In contrast to the first embodiment, in the fifth embodiment shown in FIG. 11, the column circuits 4_1 and 4_2 output signals to the horizontal signal line 6_1 via corresponding the column selection transistor M9. In addition, the column circuits 4_3 and 4_4 output signals to the horizontal signal line 6_2 via corresponding the column selection transistor M9. Other configurations according to the fifth embodiment are similar to the configurations of the first embodiment, therefore their explanations are omitted.

Next, the all-pixel reading out mode according to the fifth embodiment is described with reference to FIG. 12. The operations of the reading out the pixel signals and the column circuits 4_1 to 4_4 (operations during times t1 to t10 in FIG. 12) are similar to the operations in the all-pixel reading out mode according to the first embodiment shown in FIG. 3. Here, in the operation of reading out the amplified pixel signal, which was stored in the sample hold capacity Cs, to the horizontal signal line 6 (operation after time t11 in FIG. 12), the difference to the first embodiment is described.

In the first embodiment shown in FIG. 3, the horizontal signal lines 6_1 and 6_2 are reset to the horizontal signal line reset voltage VR by the horizontal signal line reset pulse φRS. Then, the output signals of the column circuits 4_1 and 4_2 which were stored in the sample hold capacity Cs are read out to the horizontal signal lines 6_1 and 6_2 by the column selection pulses φH1 and φH2 (time t11 in FIG. 3). Then, the horizontal signal lines 6_1 and 6_2 are reset to the horizontal signal line reset voltage VR by the horizontal signal line reset pulse φRS. Then, the output signals of the column circuits 4_3 and 4_4 which were stored in the sample hold capacity Cs are read out to the horizontal signal lines 6_1 and 6_2 by the column selection pulses φH3 and φH4 (time t12 in FIG. 3).

Figure 12:
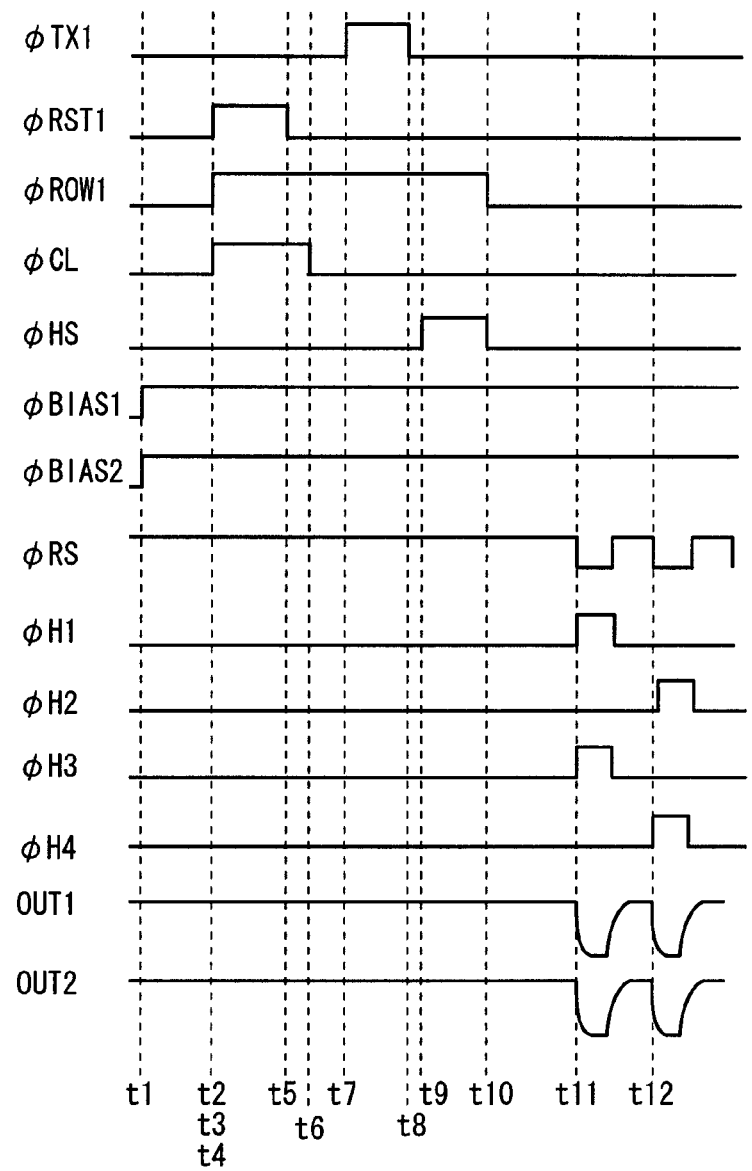
FIG. 12 is a timing chart showing an operation of reading out electric signals from all pixels in the MOS type solid-state image pickup apparatus according to the fifth embodiment.

In contrast to the first embodiment, in the fifth embodiment shown in FIG. 12, the horizontal signal lines 6_1 and 6_3 are reset to the horizontal signal reset voltage VR by the horizontal signal line reset pulse φRS. Then, the output signals of the column circuits 4_1 and 4_3 which were stored in the sample hold capacity Cs are read out to the horizontal signal lines 6_1 and 6_2 by the column selection pulses φH1 and φH3 (time t11 in FIG. 12). Then, the horizontal signal lines 6_2 and 6_4 are reset to the horizontal signal line reset voltage VR by the horizontal signal line reset pulse φRS. Then, the output signals of the column circuits 4_2 and 4_4 which were stored in the sample hold capacity Cs are read out to the horizontal signal lines 6_1 and 6_2 by the column selection pulses φH2 and φH4 (time t12 in FIG. 12).

In this case, the corresponding relation of columns between the first embodiment shown in FIG. 3 and the fifth embodiment is different, but the operations are same.

Next, the ½ column thinning out and reading out mode which thins out signals from the each column circuits 4_1 to 4_4 and reads out the signals according to the fifth embodiment is described with reference to FIG. 13. The operations of reading out the pixel signals and the column circuits 4_1 to 4_4 (operations between time t1 and t10 in FIG. 13) are similar to the operations in the all-pixel reading out mode according to the first embodiment shown in FIG. 4.

Here, in the operation of reading out the amplified pixel signal, which was stored in the sample hold capacity Cs, to the horizontal signal line 6 (operation after time t11 in FIG. 12), the difference to the first embodiment is described.

In the first embodiment shown in FIG. 4, the horizontal signal lines 6_1 and 6_2 are reset to the horizontal signal line reset voltage VR by the horizontal signal line reset pulse φRS. In addition, the column selection pulse φH1 is set to "H", and signals from the column circuit 4_1 are read out to the horizontal signal line 6_1, and the signals from the column circuit 4_2 is not read out (time t11 in FIG. 4). Then, the horizontal signal lines 6_1 and 6_2 are reset to the horizontal signal line voltage VR by the horizontal signal line reset pulse φRS. Then, the column selection pulse φH3 is set to "H", the signals from the column circuit 4_3 are read out to the horizontal signal line 6_1, and the signals from the column circuit 4_4 are not read out (time t12 in FIG. 4).

Figure 13:
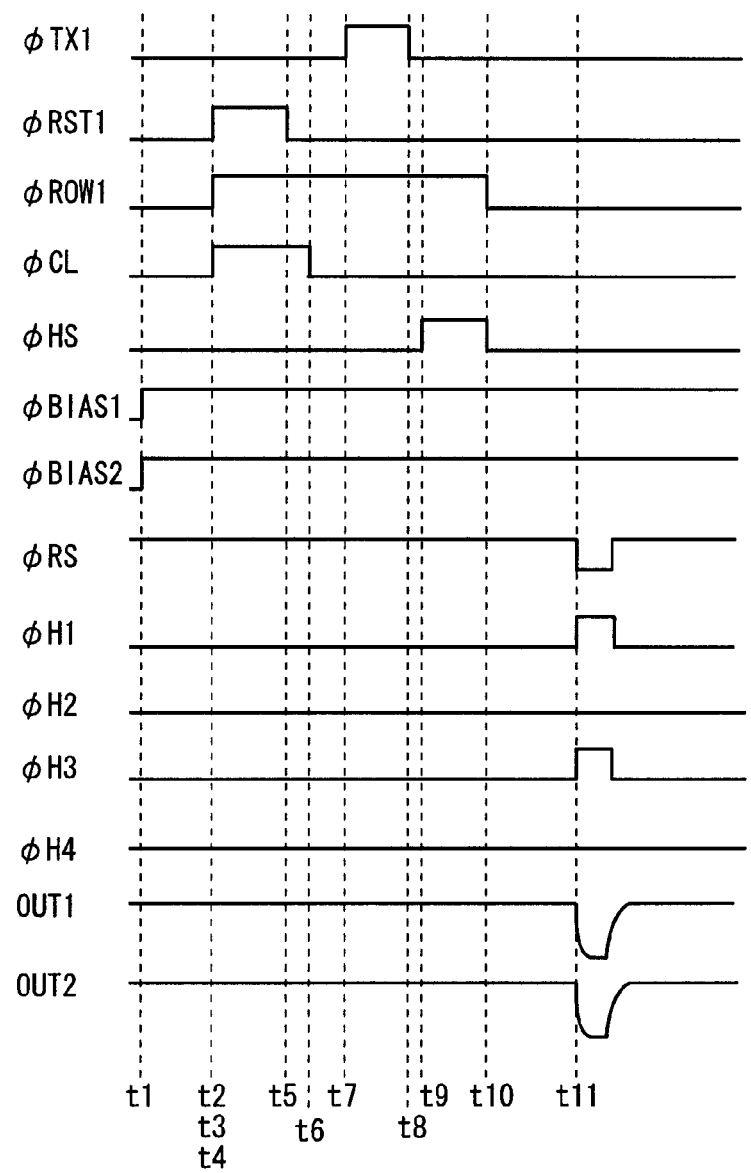
FIG. 13 is a timing chart showing an operation of thinning out and reading out electric signals in the MOS type solid-state image pickup apparatus according to the fifth embodiment.

In contrast to the first embodiment, in the fifth embodiment shown in FIG. 13, the horizontal signal lines 6_1 and 6_3 are reset to the horizontal signal line reset voltage VR by the horizontal signal line reset pulse φRS. Then, the output signals of the column circuits 4_1 and 4_3 which were stored in the sample hold capacity Cs are read out to the horizontal signal lines 6_1 and 6_3 by the column selection pulses φH1 and φH3 (time t11 in FIG. 12). Then, the signals of the column circuits 4_2 and 4_4 are not read out.

Therefore, in the ½ column thinning out and reading out mode which thins out signals from each column circuit 4_1 to 4_4 and reads out the signals, in the fifth embodiment shown in FIG. 13, it is possible to shorten the reading out time in contrast to the first embodiment shown in FIG. 4. In other words, in the first embodiment shown in FIG. 4, it is necessary the operation at time t12. However, in the fifth embodiment shown in FIG. 13, it is not necessary the operation at time t12.

Sixth Embodiment

Figure 14:
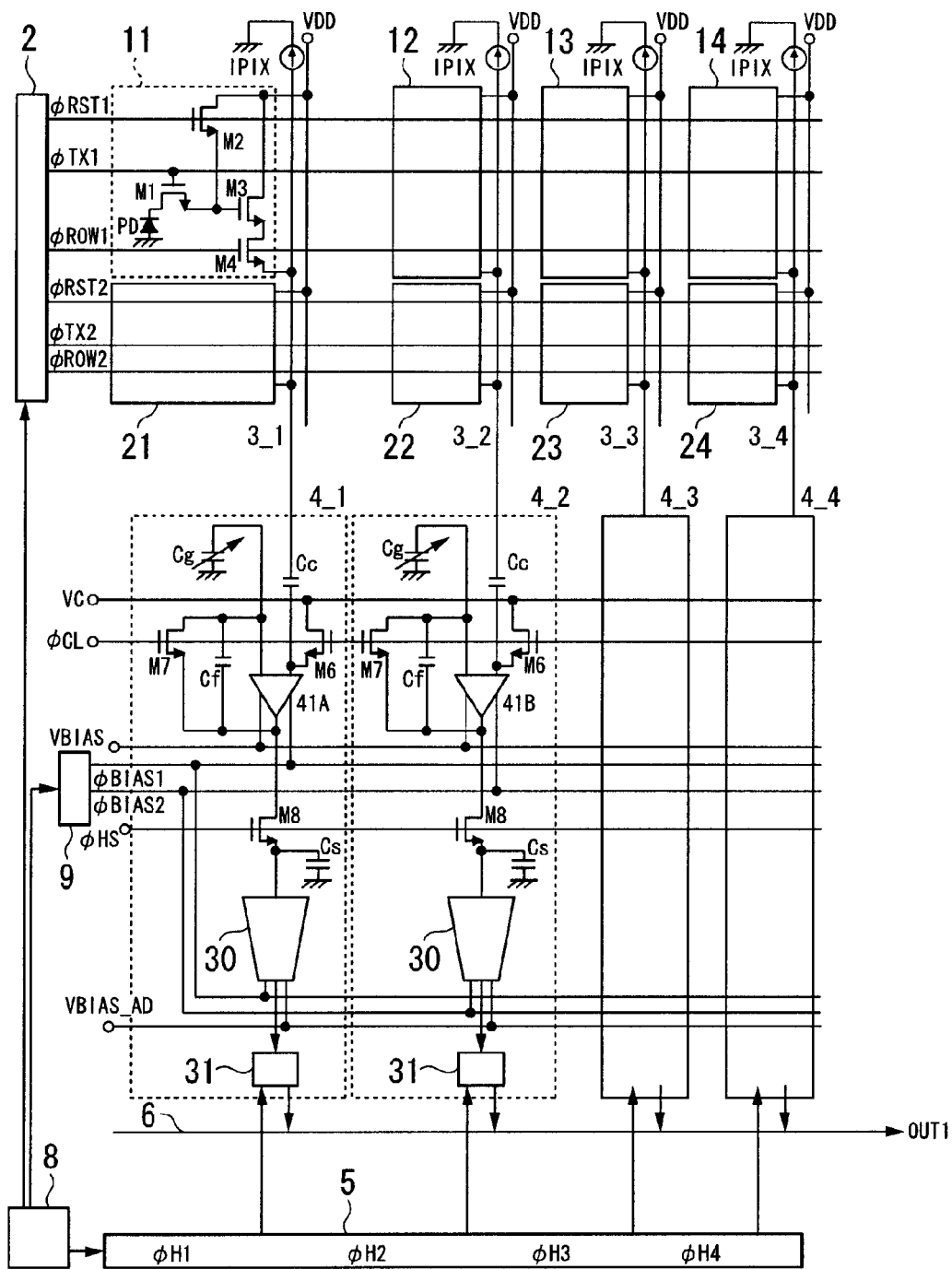
FIG. 14 is a block diagram showing a MOS type solid-state image pickup apparatus according to a sixth embodiment of the present invention.
Figure 15:
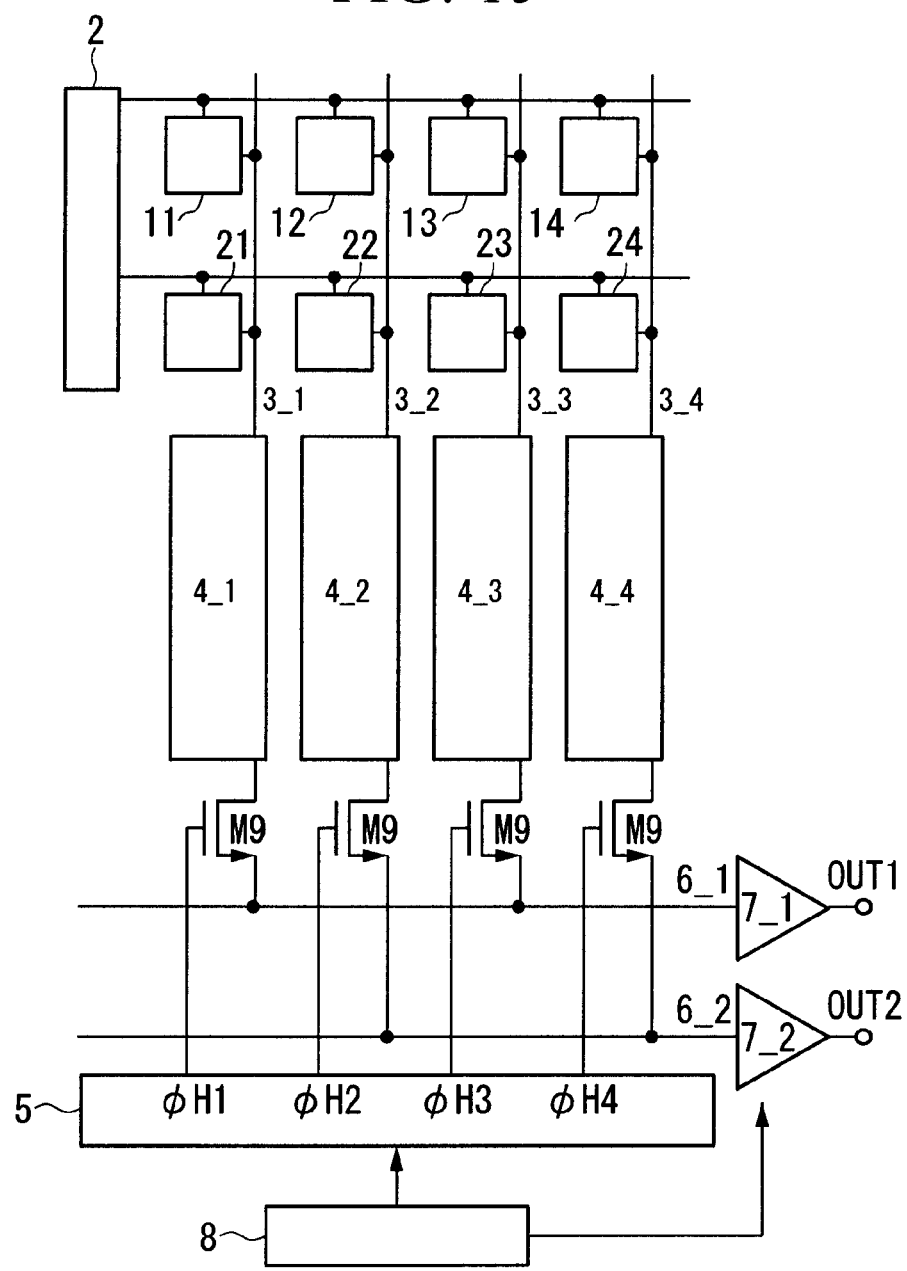
FIG. 15 is a circuit diagram showing a conventional MOS type solid-state image pickup apparatus which is able to switch between a first mode, which thins out and reads out electric signals of pixels, and a second mode, which reads out electric signals of all pixels.
Figure 15:
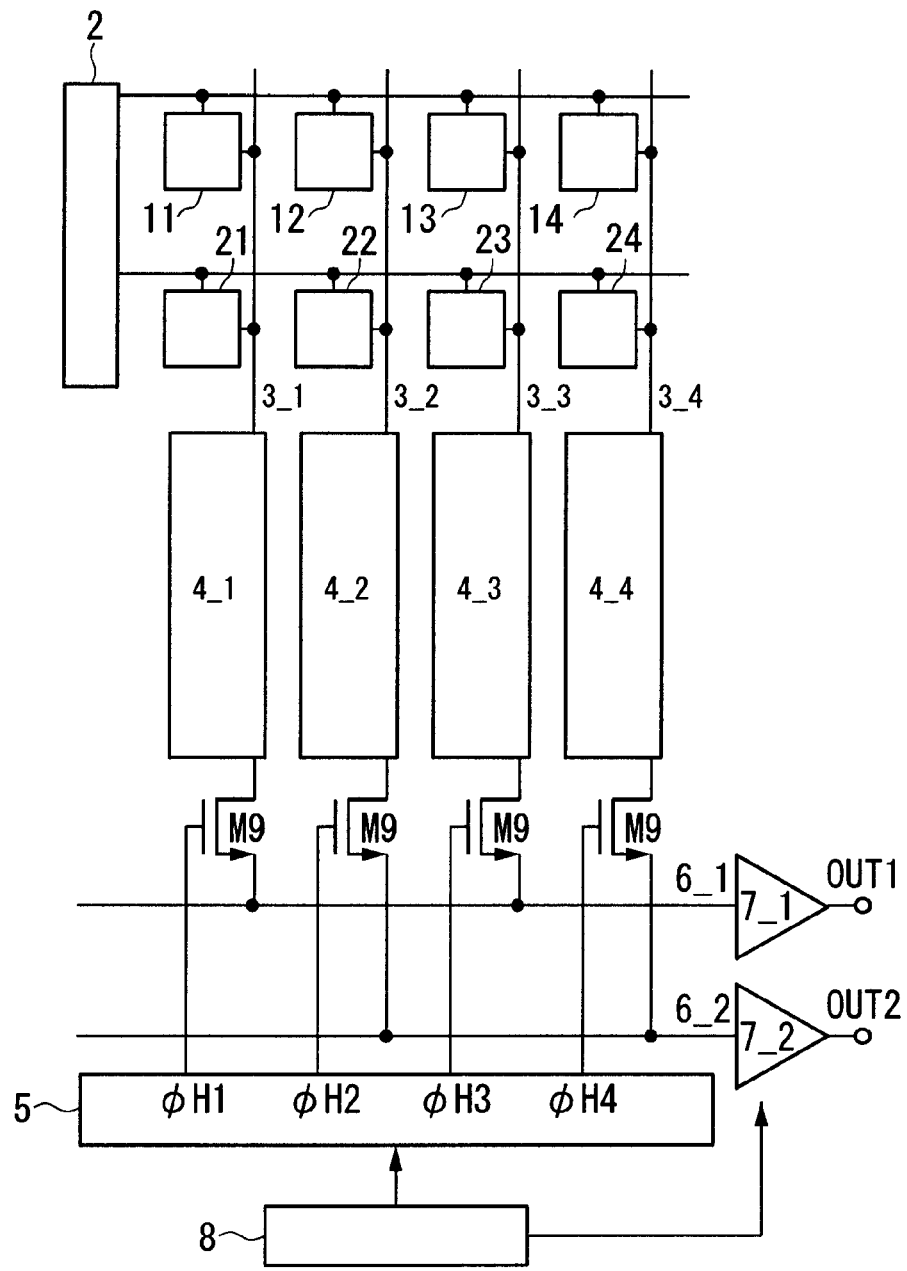
Figure 16:
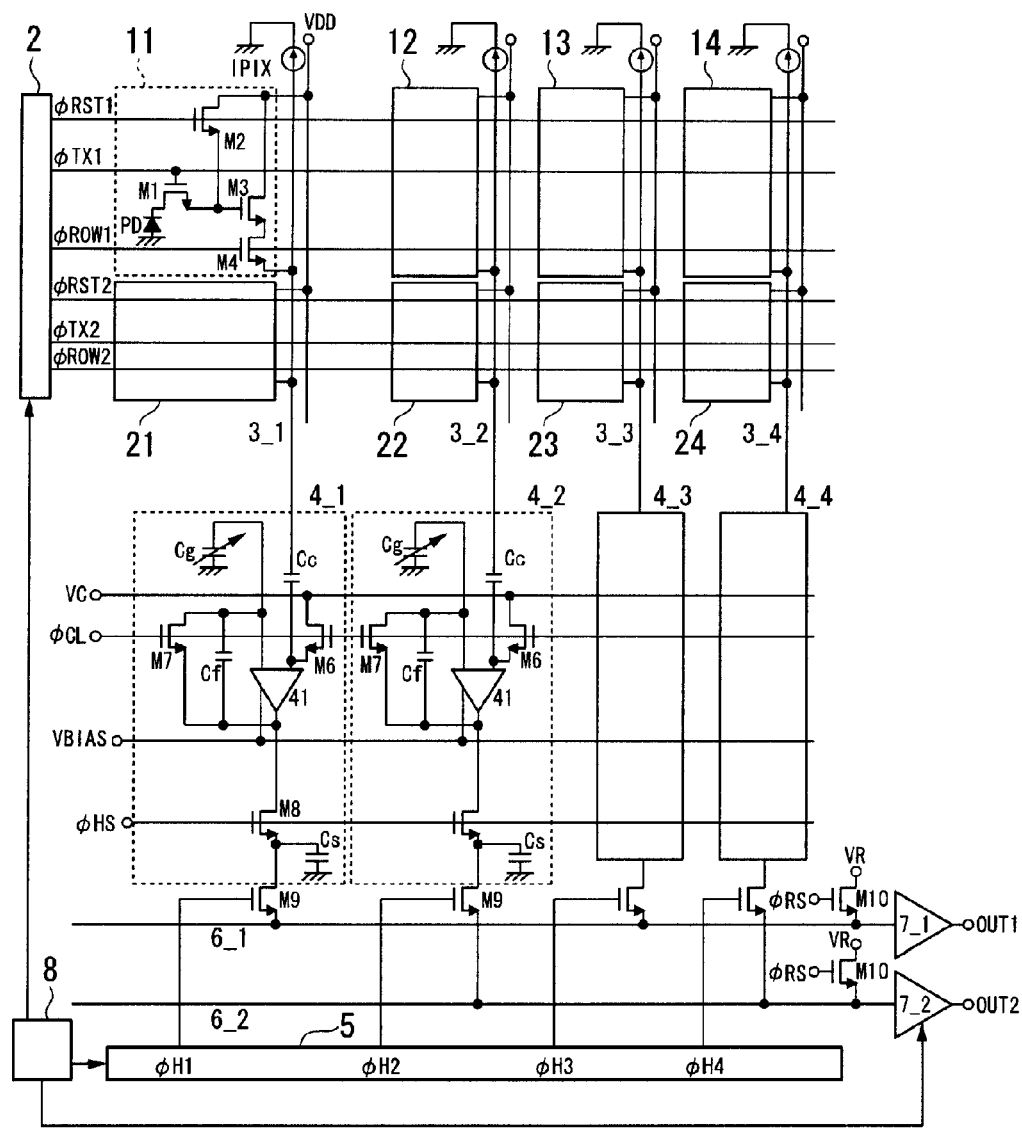
FIG. 16 is a circuit diagram showing a configuration of a conventional MOS type solid-state image pickup apparatus which has an amplification function as a column circuit.
Figure 17:
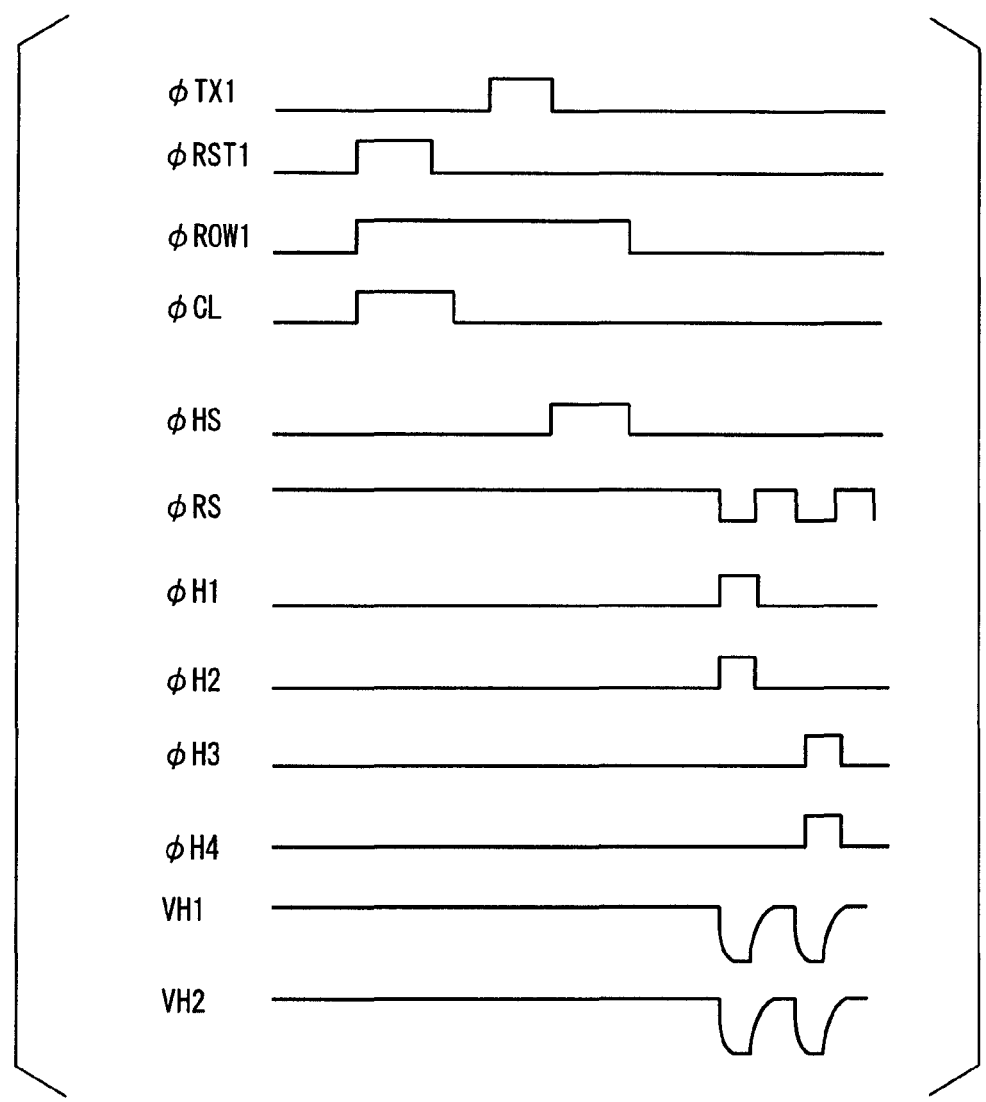
FIG. 17 is a timing chart showing an operation of reading out electric signals of all pixels in the MOS type solid-state image pickup apparatus shown in FIG. 16.
Figure 18:
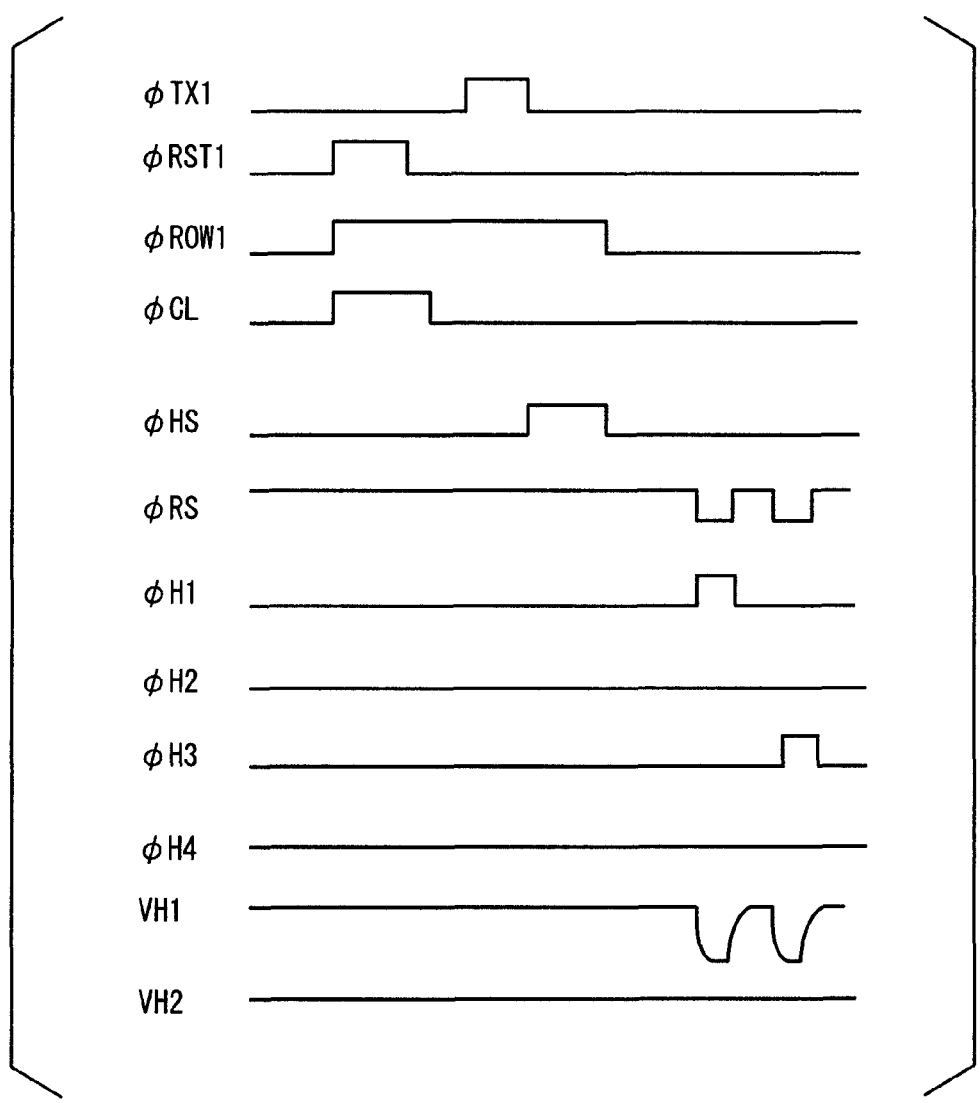
FIG. 18 is a timing chart showing an operation of thinning out and reading out electric signals of pixels in the MOS type solid-state image pickup apparatus shown in FIG. 16.

FIG. 14 is a block diagram showing a MOS type solid-state image pickup apparatus according to a sixth embodiment of the present invention. In the sixth embodiment, the column circuits 4_1 to 4_4 further include an analog digital conversion circuit 30 and a digital memory 31 in contrast to the first embodiment. The digital memory stores the value of the digital signal. The analog digital conversion circuit 30 converts electric signal from the pixel section from an analog signal to a digital signal, and stores the value of the converted digital signal in the digital memory 31. Then, digital memory 31 outputs, in accordance with the column selection pulses φH1 to φH4 input from the horizontal scanning section 5, the stored values of the digital signal to the horizontal signal line 6 sequentially.

In addition, the bias current controlling pulse φBIAS1 is supplied from the column circuit current controlling section 9 to the analog digital conversion circuit 30 of the column circuits 4_1 and 4_3. Then, the bias current controlling pulse φBIAS2 is supplied from the column circuit current controlling section 9 to the analog digital conversion circuit 30 of the column circuits 4_2 and 4_4. Then, an AD bias current controlling voltage VBIAS_AD is supplied from the control circuit to the analog digital conversion circuit 30 of the column circuits 4_1 to 4_4.

Therefore, the column circuit current controlling section 9 of the column circuits 4_1 to 4_4 is able to control similar to the column amplifiers 41A and 41B of the column circuits 4_1 to 4_4. In other words, in the analog digital conversion circuit 30 of the column circuits 4_1 to 4_4, in the mode which thins out electric signals each of a plurality of columns, it is possible to reduce the first current, which flows in the analog digital conversion circuit 30, whose electric signal is not read out, than the second current, which flows in the analog digital conversion circuit 30 which is read out electric signal.

Therefore, in the sixth embodiment, each column circuit is possible to converts analog signal to digital signal, because each column circuit 4_1 to 4_4 includes the analog digital conversion circuit 30, in contrast to the first embodiment. In addition, when the mode which thins out each of a plurality of columns and reads out electric signals is set, it is possible to reduce the consumption of electric power in column circuit.

In the first through sixth embodiments, the configuration of column circuit is not limited to the amplification circuit or the analog digital conversion circuit. The first through sixth embodiments are able to adapt to a circuit which uses bias current.

In the aforementioned embodiments, a ½ column thinning out mode is described. However, the number of lines which are thinned out is not limited two, it may be three or four. In other words, a ⅓ column thinning out mode or a ¼ column thinning out mode may be used.

In the aforementioned embodiments of the present invention, the effect described below is obtained. In other words, in the solid-state image pickup apparatus which has column circuits which use bias current, column by column, when the mode, which thins out each of a plurality of columns and reads out signal, is set. Therefore, it is possible to reduce the bias current of each column circuit, and it is possible to reduce the consumption of electric power during the thinning out mode.

While embodiments of the present invention have been described above in detail with reference to the drawings, the specific configurations thereof are not limited to those embodiments. Designs and the like that do not depart from the spirit or scope of this invention are also included.

What is claimed is:

1. A solid-state image pickup apparatus comprising:
   a pixel section which comprises a plurality of unit pixels which are arranged in a matrix, and converts an input optical signal to an electric signal;
   a column circuit which processes the electric signal which is outputted from the pixel section column by column;
   a mode setting section which switches between a first mode which thins out and reads out electric signals of the column circuits and a second mode which reads out electric signals of all the column circuits;

a column circuit current controlling section which reduces current of column circuit, whose electric signal is not read out, than current of column circuit whose electric signal is read out, when a first mode which thins out and reads out electric signals' of column circuits is set, wherein the column circuit comprises an amplification circuit which electrically amplifies the electric signal from the pixel section circuit; and an amplification element which sets an amplification factor of the column amplifier, and the solid-state image pickup apparatus further comprises:

a plurality of electric source lines, each of which supplies electric source to the amplification circuit; and a plurality of reference voltage lines, each of which supplies reference voltage to the amplification circuit, and wherein output signals from the pixel section circuit are input into one of an inversion input terminal of the amplification circuit and a non-inversion input terminal of the amplification circuit;

a terminal of the amplification element is connected to the other of the inversion input terminal of the amplification circuit and the non-inversion input terminal of the amplification circuit;

each of the plurality of electric source lines is connected to a power terminal of the corresponding amplification circuit, the plurality of electric source lines supply different current to the column circuit whose electric signal is not read out with the column circuit whose electric signal is read out;

each of the plurality of reference voltage lines is connected to a reference voltage terminal of the corresponding amplification circuit, the plurality of reference voltage lines are supplied with the same reference voltage; and each of the electric source lines and each of the reference voltage lines are separated between the column circuit whose electric signal is read out and the column circuit whose electric signal is not read out.

2. The solid-state image pickup apparatus according to claim 1, wherein the column circuit current controlling section sets current of column circuit, whose electric signal is not read out, to zero, when the first mode is set.

* * * * *